US008503612B2

(12) United States Patent
Kuwabara

(10) Patent No.: US 8,503,612 B2
(45) Date of Patent: Aug. 6, 2013

(54) RADIOGRAPHIC APPARATUS

(75) Inventor: Shoji Kuwabara, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 350 days.

(21) Appl. No.: 12/916,016

(22) Filed: Oct. 29, 2010

(65) Prior Publication Data

US 2011/0110495 A1 May 12, 2011

(30) Foreign Application Priority Data

Nov. 9, 2009 (JP) ................................. 2009-255831

(51) Int. Cl.
*H05G 1/64* (2006.01)
*G06K 9/40* (2006.01)

(52) U.S. Cl.
USPC .......................................... 378/98.4; 382/131

(58) Field of Classification Search
USPC .................. 378/91, 98, 98.4, 98.7, 98.8, 210, 378/901, 154, 147, 149, 62, 86, 87; 382/274, 382/131
See application file for complete search history.

(56) References Cited

U.S. PATENT DOCUMENTS

2009/0238324 A1* 9/2009 Oikawa ............................. 378/7
2010/0272236 A1* 10/2010 Hirooka et al. ................. 378/62

FOREIGN PATENT DOCUMENTS

JP 2002-257939 A 9/2002
JP 2009-172184 A 8/2009

OTHER PUBLICATIONS

Machine translation of Japanese Patent Publication (JP 2009-172184), published Aug. 6, 2009, The Abstract of which was provided by Applicant in IDS filed Oct. 29, 2010).*

* cited by examiner

*Primary Examiner* — Anastasia Midkiff
(74) *Attorney, Agent, or Firm* — Cheng Law Group, PLLC

(57) ABSTRACT

An estimation selecting unit is provided to select an estimating method based on a predetermined value. When variations due to a statistical error of each pixel concerned are enlarged by a greater extent than variations of other pixels, and hence a possibility of becoming conspicuous on the image, then the direct ray transmittance at the pixel concerned is considered less than the predetermined value, and estimated direct ray intensity is obtained for the pixel concerned by interpolating calculation of estimated direct ray intensities at pixels surrounding the pixel concerned. Therefore, even when variations due to a statistical error of the pixel concerned are enlarged by a greater extent than variations of other pixels, and hence a possibility of becoming conspicuous on the image, estimated direct ray intensity is obtained for the pixel concerned by interpolating calculation of estimated direct ray intensities at pixels surrounding the pixel concerned, whereby the error can be inhibited without the pixel value of the pixel concerned being conspicuous relative to the surrounding pixels on the image.

14 Claims, 7 Drawing Sheets

RADIOGRAPHIC APPARATUS

BACKGROUND OF THE INVENTION (1) Field of the Invention

This invention relates to a radiographic apparatus for use as an X-ray fluoroscopic apparatus or X-ray CT apparatus, and more particularly to a technique for removing scattered radiation.

(2) Description of the Related Art

Conventionally, in order to prevent scattered X-rays (hereinafter called simply "scattered rays") transmitted through a subject or patient from entering an X-ray detector, a medical X-ray fluoroscopic apparatus or X-ray CT (computed tomography) uses a grid (scattered radiation removing device) for removing the scattered rays. However, even if the grid is used, a false image is produced by the scattered rays passing through the grid, and a false image by absorbing foil strips constituting the grid. Particularly where a flat panel (two-dimensional) X-ray detector (FPD: Flat Panel Detector) with detecting elements arranged in rows and columns (two-dimensional matrix form) is used as the X-ray detector, a false image such as a moire pattern is produced due to a difference between the spacing of the absorbing foil strips of the grid and the pixel spacing of the FPD, besides the false image by the scattered rays. In order to reduce such false images, a false image correction is needed. In order not to produce such a moire pattern, a synchronous grid has been proposed recently, which grid has absorbing foil strips arranged parallel to either the rows or the columns of the detecting elements, and in a number corresponding to an integral multiple of the pixel spacing of the FPD, and a correction method for use of this grid is also needed (see Japanese Unexamined Patent Publication No. 2002-257939, for example).

By way of correcting moire patterns, a method of image processing which includes smoothing, for example, is carried out nowadays. When false image correction is done to excess, the resolution of direct X-rays (hereinafter called simply "direct rays") also tends to lower. Therefore, an attempt to reduce false images reliably through image processing will lower the resolution of direct rays, resulting in less clear patient images. Conversely, when greater importance is placed on the resolution of direct rays to obtain clear patient images, the false images will not be reduced through image processing, which constitutes what is called a trade-off between image processing and clearness. Thus, a perfect false image processing is difficult. Regarding the correction of the scattered rays remaining despite use of a grid, various methods have been proposed but these have disadvantages such as involving a time-consuming correcting arithmetic operation.

In connection with the correction method for use of a synchronous grid, Applicant herein has already proposed a method in which correction is carried out with respect to pixels shielded from direct rays by the absorbing foil strips, a distribution of scattered rays having passed through the grid is derived from the columns or rows of the shielded pixels, and signals of the other pixels are corrected based on the distribution. It has been proposed in the above method to set the distance between the grid and X-ray detector to an integral multiple of the height of the absorbing foil strips, and to set the position of the grid and the shape of the absorbing foil strips such that shadows of the absorbing foil strips fall only on certain pixel columns or pixel rows despite changes in the positions of a radiation emitting device such as an X-ray tube, the grid and the X-ray detector.

Further, Applicant herein has also proposed a radiographic apparatus having a function to process false images and acquire an image only of direct rays (see Japanese Unexamined Patent Publication No. 2009-172184, for example). This proposed radiographic apparatus (X-ray imaging apparatus in an embodiment) obtains, as false image processing parameters, before X-ray imaging, direct ray transmittances which are ratios between direct ray intensity before transmission through a grid and direct ray intensities after transmission through the grid, and rates of change relating to transmission scattered ray intensities which are scattered ray intensities after transmission through the grid. Based on a false image processing algorithm using the above parameters, an image only of direct rays can be acquired without false images resulting from the grid.

However, 1. grids other than synchronous grids are in wide use, and the above methods proposed by Applicant herein cannot be applied to such other grids.

2. Even where a synchronous grid is used, the above methods do not take into consideration the influence of a displacement due to deformation of the absorbing foil strips forming the grid, or shifting of position and direction of the entire grid caused by the arrangement of the absorbing foil strips not exactly parallel to either the rows or the columns of the detector.

3. Even if there is no displacement of the absorbing foil strips or the entire grid, the above methods do not take into consideration the influence of the distance between the X-ray tube (radiation emitting device) and FPD (radiation detecting device) deviating from a convergence distance (also called "standard SID") of the grid (scattered radiation removing device).

4. The method of Japanese Unexamined Patent Publication No. 2009-172184 proposed by Applicant herein gives an equation concerning an nth pixel, $G_n=P_n \cdot Cp_n+Sc_n$, where $G_n$ is an actual measurement radiation intensity (actual measurement intensity in an embodiment) obtained by actual measurement, $P_n$ is an estimated direct ray intensity which is a direct radiation intensity before transmission through the scattered radiation removing device (grid in the embodiment), $Cp_n$ is a direct ray transmittance, and $Sc_n$ is a transmission scattered ray intensity which is a scattered radiation intensity after transmission through the scattered radiation removing device (grid in the embodiment). Through this equation, the estimated direct ray intensity $P_n$ which is data of only direct rays (to be determined finally) is derived from the transmission scattered ray intensity $Sc_n$ and direct ray transmittance $Cp_n$.

However, in positions (e.g. peripheral positions of the FPD) remote from a standard position lying on a normal extending from the focus of the X-ray tube to the FPD, the shadows of the absorbing foil strips have larger widths than the shadows of the absorbing foil strips adjacent the standard position, reducing the direct ray transmittance Cp. Further, because of a design error such as a displacement due to deformation of the absorbing foil strips, an actual direct ray transmittance $Cp_n$ becomes smaller than a design direct ray transmittance $Cp_n$ When an estimated direct ray intensity $P_n$ is derived from the actual measurement radiation intensity G using the above-noted equation, the direct ray transmittance $Cp_n$ has a value of one or less, and the transmission scattered ray intensity $Sc_n$ has a value of one or more. Naturally, therefore, the estimated direct ray intensity $P_n$ has a larger value than the actual measurement radiation intensity G. This is clear from the fact that the actual measurement radiation intensity is a value obtained after transmission through the grid. Therefore, when the estimated direct ray intensity $P_n$ is obtained, variations (what is called deviations) due to statistical fluctuations of the actual measurement radiation intensity G will also become enlarged. When the actual direct ray transmittance $Cp_n$ is smaller than direct ray transmittances at other pixels from the above-noted causes (i.e. position remote from the standard position, and design error), the enlargement ratio also becomes larger than at the other pixels, and the variation due to a statistical error is also enlarged by a greater extent than variations at the other pixels, to be conspicuous on the image.

5. When a ratio concerning variations of the direct ray transmittance $Cp_n$ in the direction along the absorbing foil strips is a rate of change of the direct ray transmittance, the distortion of the absorbing foil strips and the like cause the direct ray transmittance $Cp_n$ to vary sharply between the pixels in the direction along the absorbing foil strips. When the rate of change is large, an estimation error takes place with the direct ray transmittance $Cp_n$. In order to eliminate the variations due to the statistical error of the direct ray transmittance $Cp_n$ along the direction of the absorbing foil strips, an average of direct ray transmittances $Cp_n$ of a predetermined number of pixels (e.g. 20 pixels or 30 pixels) is usually calculated, and an estimated direct ray intensity $P_n$ is determined using the average. Therefore, when the rate of change of the direct ray transmittance is large due to distortion of the absorbing foil strips and the like, direct ray transmittances $Cp_n$ with extremely large values or extremely small values will falsify the average itself. Images with the extremely large values or extremely small values will appear locally in each pixel area formed of the predetermined number of pixels used for obtaining the average. It is to be noted here that the rate of change of the direct ray transmittance is different from the foregoing rate of change about transmission scattered ray intensity.

Problems 1-3 can be solved by the technique disclosed in Japanese Unexamined Patent Publication No. 2009-172184. Problems 4 and 5 cannot be solved where the equation ($G_n=Cp_n+Sc_n$) in Japanese Unexamined Patent Publication No. 2009-172184 is used.

SUMMARY OF THE INVENTION

This invention has been made having regard to the state of the art noted above, and its object is to provide radiographic apparatus which can inhibit the error.

The above object is fulfilled, according to this invention, by a radiographic apparatus for obtaining a radiological image, comprising a radiation emitting device for emitting radiation; a scattered radiation removing device for removing scattered radiation, the scattered radiation removing device having absorbing layers arranged at predetermined intervals for absorbing the scattered radiation; a radiation detecting device having a plurality of detecting elements arranged in rows and columns for detecting the radiation; and an estimation selecting device for estimating direct radiation intensity at pixels where direct radiation is attenuated by the absorbing layers, by assuming that the absorbing layers were absent; wherein the estimation selecting device is arranged, when direct radiation transmittance which is a ratio between direct radiation intensity before transmission and direct radiation intensity after transmission through the scattered radiation removing device is equal or higher than a predetermined value at each pixel concerned, to estimate direct radiation intensity for the pixel concerned using actual measurement radiation intensity at the pixel concerned obtained from actual measurement and the direct radiation transmittance, and when the direct radiation transmittance is less than the predetermined value at the pixel concerned, to estimate direct radiation intensity for the pixel concerned by interpolating calculation of direct radiation intensities at pixels surrounding the pixel concerned.

[Functions and Effects] According to the radiographic apparatus of this invention, for pixels with an attenuation of direct radiation due to the absorbing layers, direct radiation intensities may be estimated as finally obtained intensities for those pixels on an assumption that there are no absorbing layers. In that case, usually, the estimation is carried out using actual measurement radiation intensity obtained by actual measurement of each pixel concerned and direct radiation transmittance (which is a ratio between direct radiation intensity before transmission and direct radiation intensity after transmission through the scattered radiation removing device). When the actual direct radiation transmittance at the pixel concerned is smaller than direct radiation transmittances at other pixels, the enlargement ratio also becomes larger than at the other pixels as noted above, and variations due to a statistical error may also be enlarged by a greater extent than variations at the other pixels, to be conspicuous on the image. Then, the predetermined value is set by considering the direct radiation transmittances at the other pixels, for example. When the direct radiation transmittance at the pixel concerned is equal or higher than the predetermined value, the direct radiation intensity is estimated for the pixel concerned, using actual measurement intensity and direct radiation transmittance as in the prior art. When the direct radiation transmittance at the pixel concerned is less than the predetermined value, the direct radiation intensity is estimated for the pixel concerned, by interpolating calculation of direct radiation intensities at pixels surrounding the pixel concerned. The estimation selecting device is provided to select an estimating method based on the predetermined value in this way. When variations due to a statistical error of the pixel concerned are enlarged by a greater extent than variations of the other pixels, and hence a possibility of becoming conspicuous on the image, then the direct radiation transmittance at the pixel concerned is considered less than the predetermined value, and direct radiation intensity is estimated for the pixel concerned by interpolating calculation of direct radiation intensities at pixels surrounding the pixel concerned. Therefore, even when variations due to a statistical error of the pixel concerned are enlarged by a greater extent than variations of the other pixels, and hence a possibility of becoming conspicuous on the image, direct radiation intensities are estimated for the pixel concerned by interpolating calculation of direct radiation intensities at pixels surrounding the pixel concerned, whereby the error can be inhibited without the pixel value of the pixel concerned being conspicuous relative to the surrounding pixels on the image.

In another aspect of the invention, a radiographic apparatus is provided for obtaining a radiological image, which comprises a radiation emitting device for emitting radiation; a scattered radiation removing device for removing scattered radiation, the scattered radiation removing device having absorbing layers arranged at predetermined intervals for absorbing the scattered radiation; a radiation detecting device having a plurality of detecting elements arranged in rows and columns for detecting the radiation; and an estimation selecting device for estimating direct radiation intensity at pixels where direct radiation is attenuated by the absorbing layers, by assuming that the absorbing layers were absent; wherein, regarding direct radiation transmittance which is a ratio between direct radiation intensity before transmission and direct radiation intensity after transmission through the scattered radiation removing device, the estimation selecting device is arranged, when a rate of change of the direct radiation transmittance which is a rate of change of the direct radiation transmittance in a direction along the absorbing layers is less than a predetermined value at each pixel concerned, to estimate direct radiation intensity for the pixel concerned using actual measurement radiation intensities at the pixel concerned obtained from actual measurement and the direct radiation transmittance, and when the rate of change is equal or higher than the predetermined value at the pixel concerned, to estimate direct radiation intensity for the pixel concerned by interpolating calculation of direct radiation intensities at pixels surrounding the pixel concerned.

[Functions and Effects] According to the above radiographic apparatus of this invention, for pixels with an attenuation of direct radiation due to the absorbing layers, direct radiation intensities may be estimated as finally obtained intensities for those pixels on an assumption that there are no absorbing layers. In that case, usually, the estimation is carried out using actual measurement radiation intensity obtained by actual measurement of each pixel concerned and direct radiation transmittance (which is a ratio between direct radiation intensity before transmission and direct radiation intensity after transmission through the scattered radiation removing device). As noted hereinbefore, an estimation error will take place with the direct radiation transmittances when there are large variations of direct radiation transmittances with surrounding pixels, including the pixel concerned, in the direction along the absorbing layers, that is when the rate of change which is a rate about the variations of the direct radiation transmittances in the direction along the absorbing layers is large. Then, the predetermined value is set by considering deviations and the like of the direct radiation transmittances of the surrounding pixels including the pixel concerned. When the rate of change of the direct radiation transmittance at the pixel concerned is less than the predetermined value, the direct radiation intensity is estimated for the pixel concerned, using actual measurement intensity and direct radiation transmittance as in the prior art. When the rate of change of the direct radiation transmittance at the pixel concerned is equal or higher than the predetermined value, the direct radiation intensity is estimated for the pixel concerned, by interpolating calculation of direct radiation intensities at the pixels surrounding the pixel concerned. The estimation selecting device is provided to select an estimating method based on the predetermined value in this way. When the rate of change is large, and hence a possibility of errors in estimating the direct radiation transmittance, then the rate of change is considered equal or higher than the predetermined value, and direct radiation intensity is estimated for the pixel concerned by interpolating calculation of direct radiation intensities at pixels surrounding the pixel concerned. Therefore, even when the rate of change is large, and hence a possibility of errors in estimating the direct radiation transmittances, direct radiation intensity is estimated for the pixel concerned by interpolating calculation of direct radiation intensities at pixels surrounding the pixel concerned, whereby the errors in estimating the direct radiation transmittances can be inhibited.

In the above two radiographic apparatus of this invention, it is preferred that the surrounding pixels (used in the interpolating calculation) are pixels adjoining the pixel concerned. That is, when there are sharp variations in the estimated direct radiation intensities between the pixels, a more exact direct radiation intensity can be estimated by estimating direct radiation intensity for the pixel concerned by interpolating calculation of direct radiation intensities of the adjoining pixels having less sharp variations. The interpolating operation is not limited to the adjoining pixels only, when interpolation is carried out using parameters of surrounding pixels including the adjoining pixels such as spline interpolation or Lagrange interpolation.

To summarize the above, according to the radiographic apparatus of this invention, the estimation selecting device is provided to select an estimating method based on the predetermined value in this way. When variations due to a statistical error of each pixel concerned are enlarged by a greater extent than variations of the other pixels, and hence a possibility of becoming conspicuous on the image, then the direct radiation transmittance at the pixel concerned is considered less than the predetermined value, and direct radiation intensity is estimated for the pixel concerned by interpolating calculation of direct radiation intensities at pixels surrounding the pixel concerned. Therefore, even when variations due to a statistical error of the pixel concerned are enlarged by a greater extent than variations of the other pixels, and hence a possibility of becoming conspicuous on the image, direct radiation intensity is estimated for the pixel concerned by interpolating calculation of direct radiation intensities at pixels surrounding the pixel concerned, whereby the error can be inhibited without the pixel value of the pixel concerned being conspicuous relative to the surrounding pixels on the image.

According to the other radiographic apparatus, the estimation selecting device is provided to select an estimating method based on the predetermined value in this way. When the rate of change is large, and hence a possibility of errors in estimating the direct radiation transmittances, then the rate of change is considered equal or higher than the predetermined value, and direct radiation intensity is estimated for the pixel concerned by interpolating calculation of direct radiation intensities at pixels surrounding the pixel concerned. Therefore, even when the rate of change is large, and hence a possibility of errors in estimating the direct radiation transmittances, direct radiation intensity is estimated for the pixel concerned by interpolating calculation of direct radiation intensities at pixels surrounding the pixel concerned, whereby the errors in estimating the direct radiation transmittances can be inhibited.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of this invention will be described in detail hereinafter with reference to the drawings.

Figure 1:
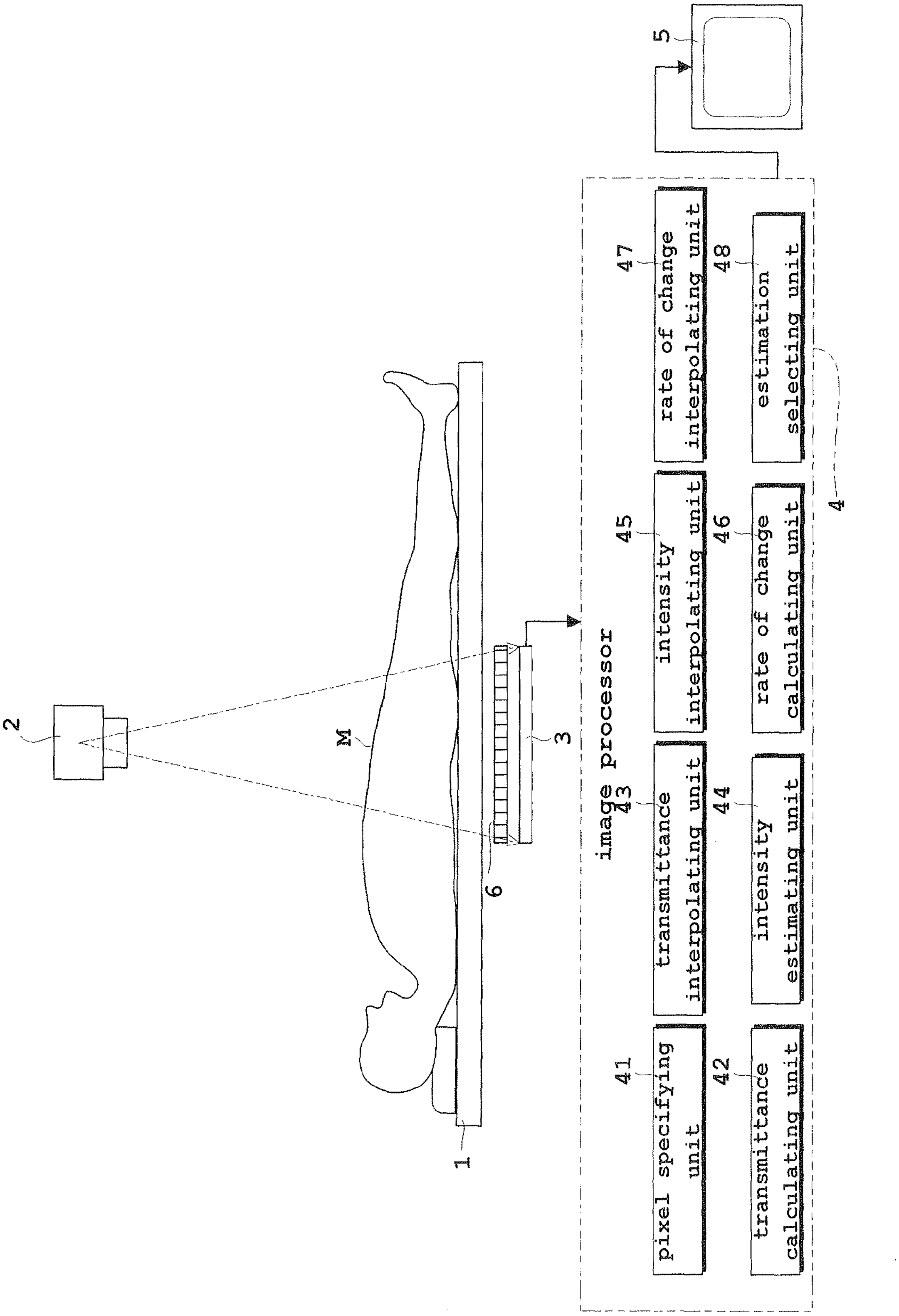
FIG. 1 is a block diagram of an X-ray imaging apparatus according to this invention.
Figure 2:
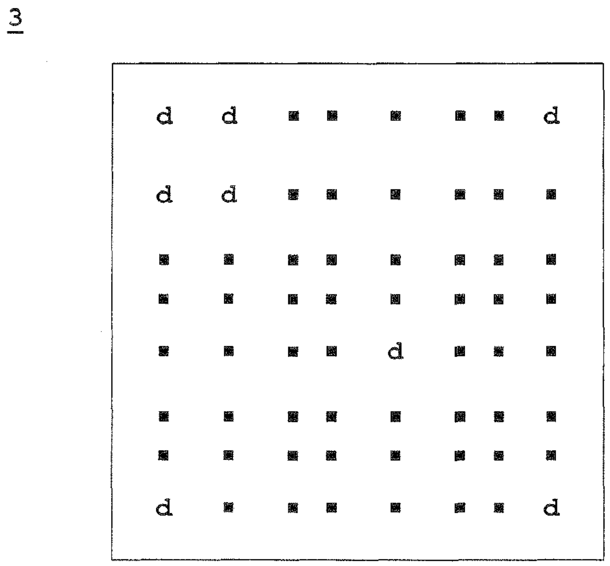
FIG. 2 is a schematic view of a detecting plane of a flat panel X-ray detector (FPD)
Figure 3:
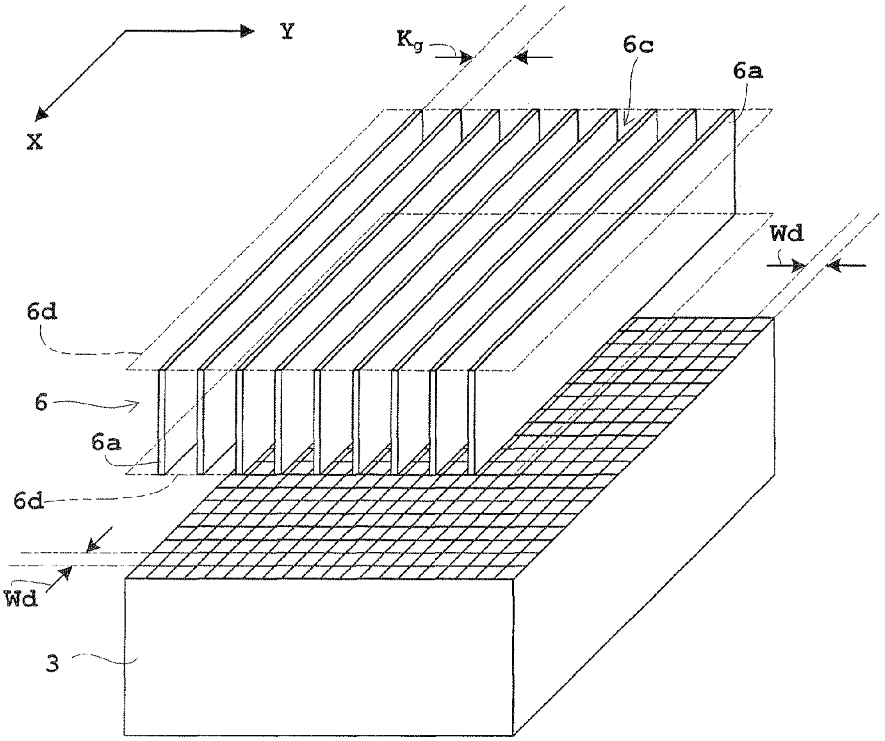
FIG. 3 is a schematic view of a synchronous grid.

FIG. 1 is a block diagram of an X-ray imaging apparatus according to this invention. FIG. 2 is a schematic view of a detecting plane of a flat panel X-ray detector (FPD). FIG. 3 is a schematic view of a synchronous X-ray grid. This embodiment will be described taking X-rays as an example of radiation.

As shown in FIG. 1, the X-ray imaging apparatus according to this invention includes a top board 1 for supporting a subject M, an X-ray tube 2 for emitting X-rays toward the subject M, a flat panel X-ray detector (hereinafter abbreviated as "FPD") 3 for detecting the X-rays emitted from the X-ray tube 2 and transmitted through the subject M, an image processor 4 for carrying out image processes based on the X-rays detected by the FPD 3, and a display 5 for displaying X-ray images having undergone the image processes by the image processor 4. The display 5 is in the form of a display device such as a monitor, television or the like. A grid 6 is attached to the detecting plane of the FPD 3. The X-ray tube 2 corresponds to the radiation emitting device in this invention. The flat panel X-ray detector (FPD) 3 corresponds to the radiation detecting device in this invention. The grid 6 corresponds to the scattered radiation removing device in this invention.

The image processor 4 includes a central processing unit (CPU) and others. The programs and the like for carrying out various image processes are written and stored in a storage medium represented by a ROM (Read-only Memory). The CPU of the image processor 4 reads from the storage medium and executes the programs and the like to carry out image processes corresponding to the programs. In particular, a pixel specifying unit 41, a transmittance calculating unit 42, a transmittance interpolating unit 43, an intensity estimating unit 44, an intensity interpolating unit 45, a rate of change calculating unit 46, a rate of change interpolating unit 47 and an estimation selecting unit 48, described hereinafter, of the image processor 4 execute a program relating to specification of certain predetermined pixels, calculation and interpolation of direct ray transmittances, intensity estimation and interpolation, calculation of rates of change, and estimate selection. In this way, the above components carry out specification of the certain pixels, calculation and interpolation of the direct ray transmittances, intensity estimation and interpolation, calculation and interpolation of the rates of change, and estimate selection, corresponding to the program, respectively.

The image processor 4 includes the pixel specifying unit 41 for specifying certain predetermined pixels, the transmittance calculating unit 42 for calculating direct ray transmittances, the transmittance interpolating unit 43 for interpolating the direct ray transmittances, the intensity estimating unit 44 for estimating intensities, the intensity interpolating unit 45 for interpolating the intensities, the rate of change calculating unit 46 for calculating rates of change, the rate of change interpolating unit 47 for interpolating the rates of change, and the estimation selecting unit 48 for estimating direct ray intensities. The estimation selecting unit 48 corresponds to the estimation selecting device in this invention.

As shown in FIG. 2, the FPD 3 has a plurality of detecting elements d sensitive to X-rays arranged in a two-dimensional matrix form on the detecting plane thereof. The detecting elements d detect X-rays by converting the X-rays transmitted through the subject M into electric signals to be stored once, and reading the electric signals stored. The electric signal detected by each detecting element d is converted into a pixel value corresponding to the electric signal. An X-ray image is outputted by allotting the pixel values to pixels corresponding to positions of the detecting elements d. The X-ray image is fed to the pixel specifying unit 41, transmittance calculating unit 42 and intensity estimating unit 44 of the image processor 4 (see FIGS. 1 and 4). Thus, the FPD 3 has the plurality of detecting elements d arranged in a matrix form (two-dimensional matrix form) for detecting X-rays. The detecting elements d correspond to the detecting elements in this invention.

As shown in FIG. 3, the grid 6 has, arranged alternately, absorbing foil strips 6*a* for absorbing scattered rays (scattered X-rays), and intermediate layers 6*c* for transmitting scattered rays through. That is, the grid 6 is formed of absorbing foil strips 6*a* arranged at predetermined intervals. The absorbing foil strips 6*a* and intermediate layers 6*c* are covered by grid covers 6*d* located on an X-ray incidence plane and on an opposite plane with the absorbing foil strips 6*a* and intermediate layers 6*c* in between. In order to clarify illustration of the absorbing foil strips 6*a*, the grid covers 6*d* are shown in two-dot chain lines, and other details of the grid 6 (e.g. a structure for supporting the absorbing foil strips 6*a*) are not shown. The absorbing foil strips 6*a* correspond to the absorbing layers in this invention.

Figure 6:
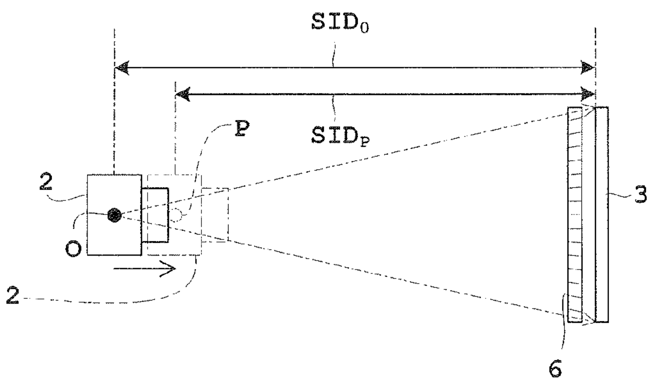
FIG. 6 is a schematic view of X-ray imaging without a subject.

In this embodiment, the grid 6 is what is known as a convergence grid in which, at a standard SID ($SID_0$) as shown in FIG. 6, the absorbing foil strips 6*a* are inclined to be parallel to directions of X-rays emitted in the shape of a cone from focus O of the X-ray tube 2. Here, "SID" refers to a distance of the X-ray tube 2 to the FPD 3 (SID: Source Image Distance) along a normal extending from the X-ray tube 2 to the FPD 3.

This embodiment employs a synchronous grid as the grid 6. Specifically, the absorbing foil strips 6*a* and intermediate layers 6*c* extending in an X-direction in FIG. 3 are arranged alternately in order in a Y-direction in FIG. 3. The X-direction in FIG. 3 is parallel to the direction of columns of detecting elements d of FPD 3 (see FIG. 2), while the Y-direction in FIG. 3 is parallel to the direction of rows of the detecting elements d of FPD 3 (see FIG. 2). In this embodiment, therefore, the direction of arrangement of absorbing foil strips 6*a* is parallel to the rows of detecting elements d. At standard SID ($SID_0$), spacing $K_g$ between the absorbing foil strips 6*a* adjoining in the Y-direction is synchronized with an integral multiple (shown to be double in FIG. 3) of spacing Wd between the pixels adjoining on an extension thereof.

In this embodiment, the intermediate layers 6*c* are void. Therefore, the grid 6 is also an air grid. The absorbing foil strips 6*a* are not limited to any particular material, as long as a material such as lead is used which absorbs radiation represented by X-rays. As the intermediate layers 6*c*, instead of being void as noted above, any intermediate material such as aluminum or organic substance may be used which transmits radiation represented by X-rays.

Figure 4:
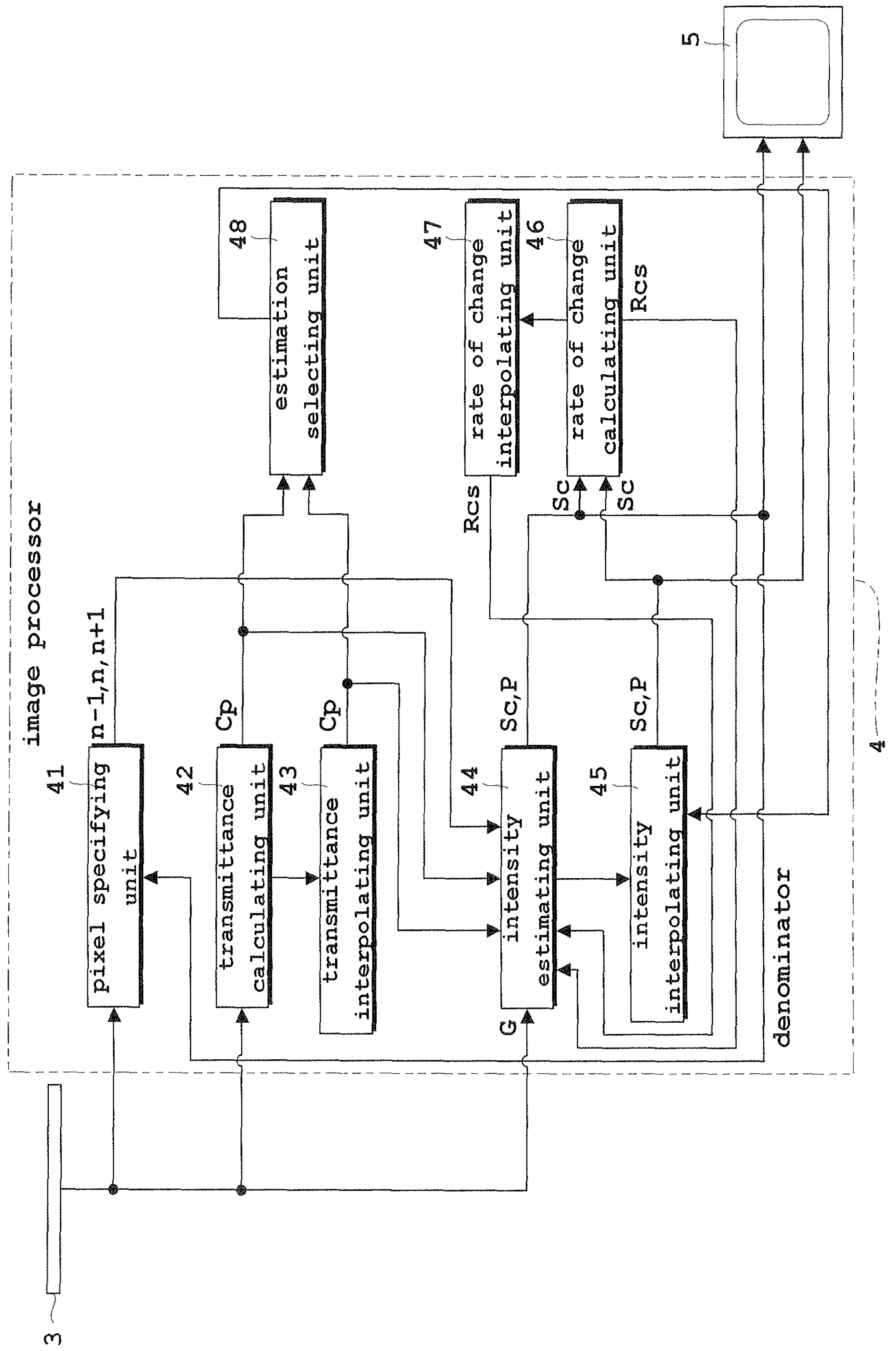
FIG. 4 is a block diagram showing a specific construction of an image processor and data flows according to this invention.
Figure 5:
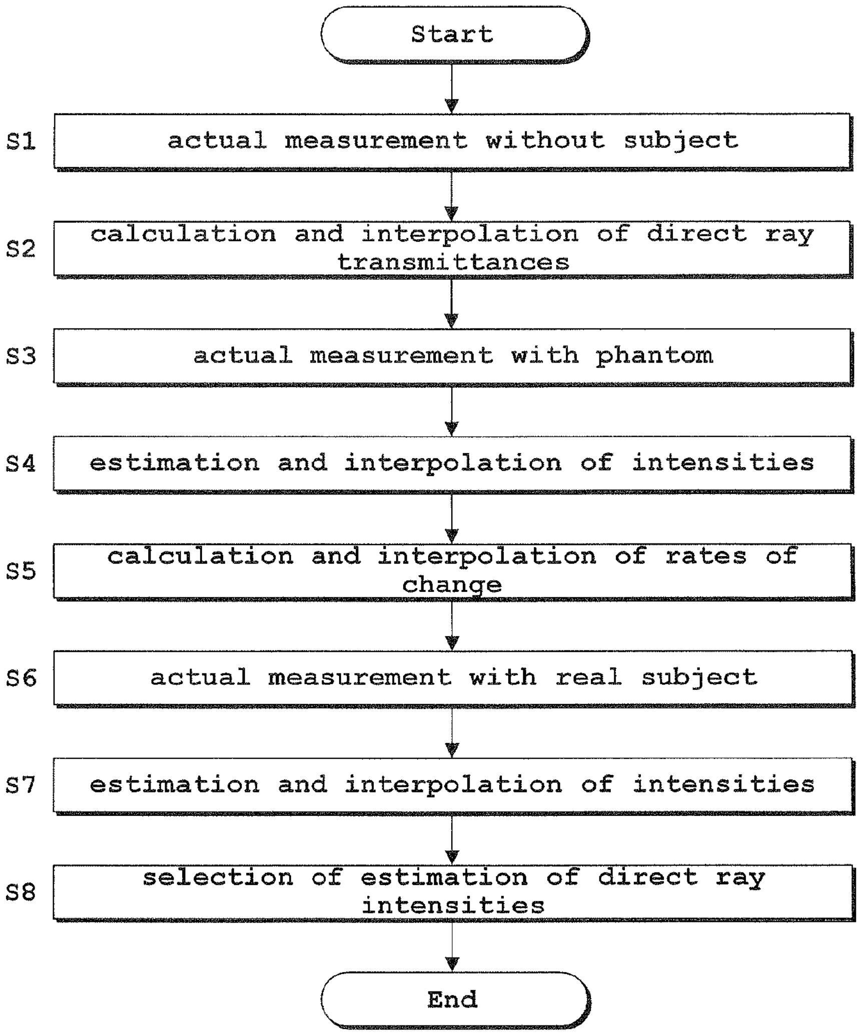
FIG. 5 is a flow chart showing a sequence of X-ray imaging according to the invention.
Figure 7:
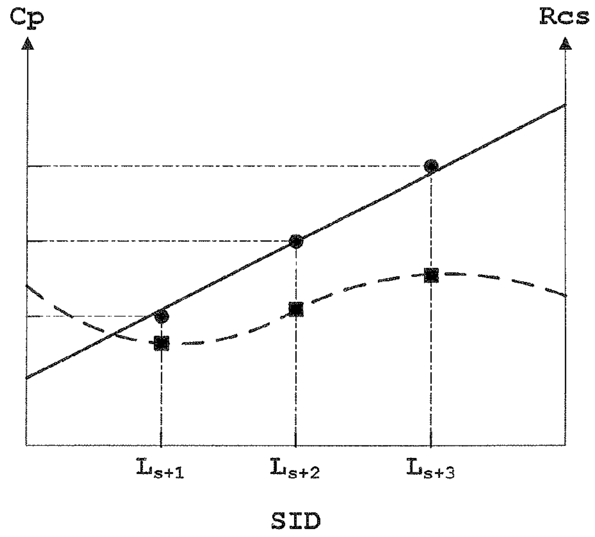
FIG. 7 is a graph schematically showing a relationship between SID, direct ray transmittance and rate of change of transmission scattered ray intensity.
Figure 8:
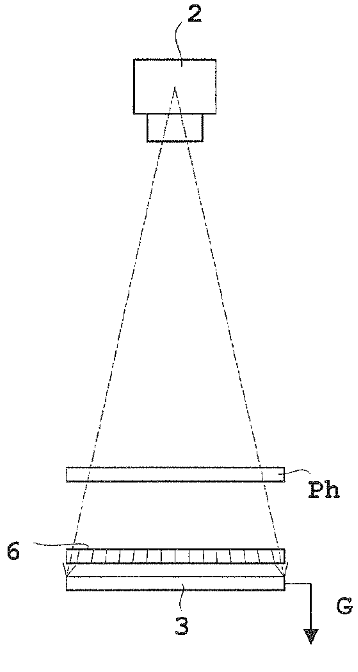
FIG. 8 is a view schematically showing X-ray imaging in the presence of a subject, using a phantom in the form of an acrylic plate as the subject.
Figure 9:
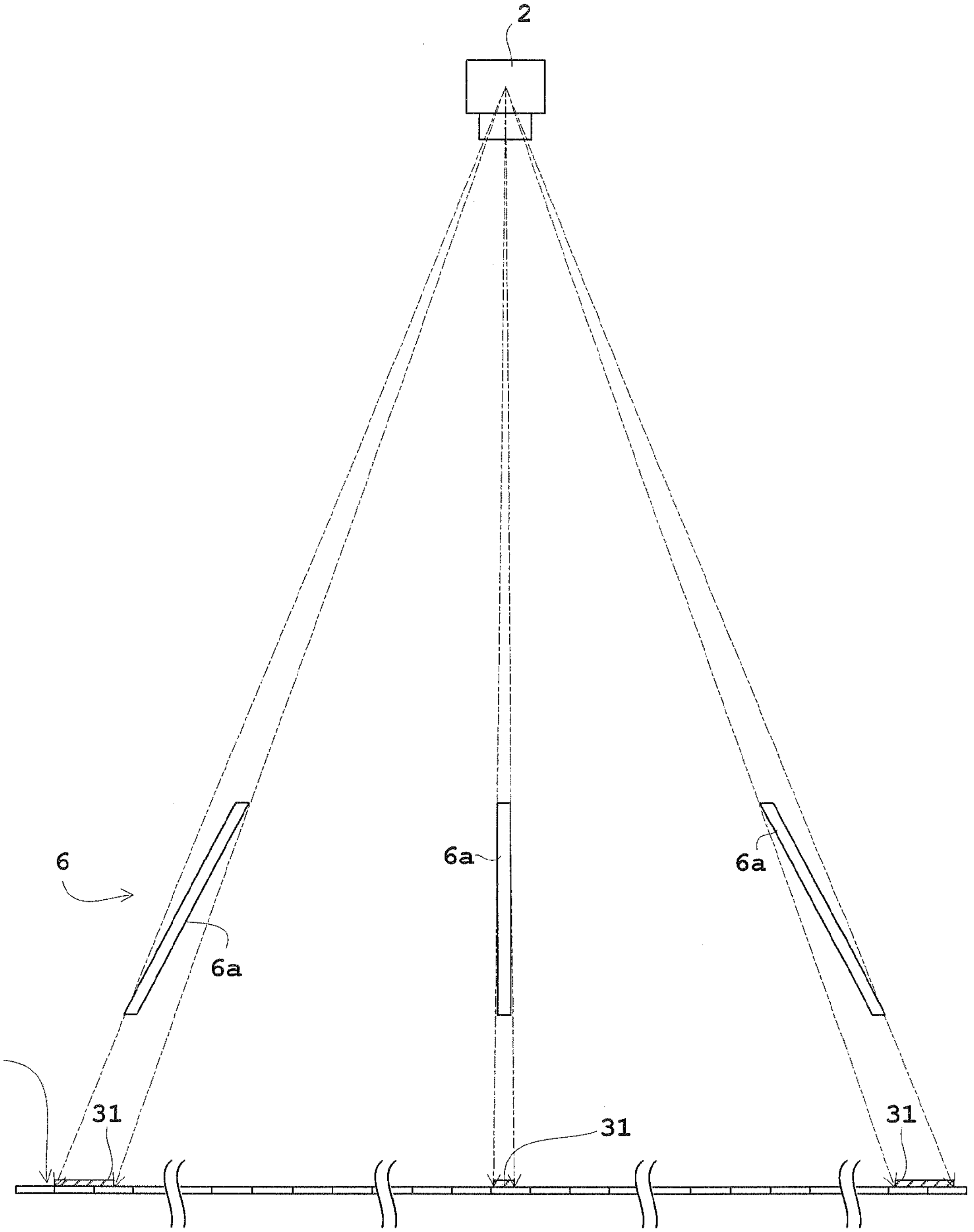
FIG. 9 is a view schematically showing shadows of the grid adjacent a standard position and peripheral positions.

An actual X-ray imaging and data flows according to this embodiment will be described with reference to FIGS. 4 through 9. FIG. 4 is a block diagram showing a specific construction of the image processor and data flows. FIG. 5 is a flow chart showing a sequence of X-ray imaging according to this embodiment. FIG. 6 is a schematic view of X-ray imaging without a subject. FIG. 7 is a graph schematically showing a relationship between SID, direct ray transmittance and rate of change of transmission scattered ray intensity. FIG. 8 is a view schematically showing X-ray imaging in the presence of a subject, using a phantom in the form of an acrylic plate as the subject. FIG. 9 is a view schematically showing shadows of the grid adjacent a standard position and peripheral positions.

As shown in FIG. 4, the pixel specifying unit 41 specifies certain pixels among the pixels forming an X-ray image. In this embodiment, the pixel specifying unit 41 specifies a combination of three pixels consisting of an (n−1)th pixel, an adjoining, nth pixel and a next adjoining, (n+1)th pixel (indicated "n−1", "n" and "n+1" in FIG. 4), and feeds the combination to the intensity estimating unit 44. When the absolute value of the denominator included in the solution of simultaneous equations described hereinafter has a predetermined value or less, the pixel specifying unit 41 does not select the pixels forming the combination for the simultaneous equations, but selects and specifies other pixels for the combination. Since the simultaneous equations are derived from the intensity estimating unit 44 as is clear from the description made hereinafter, data relating to the denominator (indicated "denominator" in FIG. 4) derived from the intensity estimating unit 44 is fed to the pixel specifying unit 41.

The transmittance calculating unit 42 determines, in relation to discrete distances between the X-ray tube 2 and the grid 6/FPD 3, direct ray transmittances which are ratios between direct ray (direct X-ray) intensities before transmission and direct ray intensities after transmission through the grid 6 obtained from actual measurements taken in the absence of a subject. In this embodiment, the transmittance calculating unit 42 calculates the direct ray transmittances (indicated "Cp" in FIG. 4), and feeds the transmittances to the transmittance interpolating unit 43, intensity estimating unit 44 and estimation selecting unit 48.

The transmittance interpolating unit 43 interpolates the direct ray transmittances Cp calculated by the transmittance calculating unit 42 in distances around the above discrete distances. The interpolated direct ray transmittances Cp also are fed to the intensity estimating unit 44 and estimation selecting unit 48.

The intensity estimating unit 44 estimates at least either of scattered ray intensities (scattered X-ray intensities) at the predetermined pixels specified by the pixel specifying unit 41, and direct ray intensities (direct X-ray intensities) at the predetermined pixels. In this embodiment, based on the direct ray transmittances Cp calculated by the transmittance calculating unit 42, or the direct ray transmittances Cp interpolated by the transmittance interpolating unit 43, and actual measurement intensities (indicated "G" in FIG. 4) which are intensities after transmission through the grid 6 in an actual measurement taken in the presence of a subject M, the intensity estimating unit 44 estimates transmission scattered ray intensities (indicated "Sc" in FIG. 4) and estimated direct ray intensities (indicated "P" in FIG. 4), and feeds the intensities to the intensity interpolating unit 45, rate of change calculating unit 46 and display 5. In this embodiment, the intensity estimating unit 44 estimates the transmission scattered ray intensities Sc and estimated direct ray intensities P by solving the simultaneous equations, and therefore data "denominator" relating to the denominator included in the solution is also obtained. The intensity estimating unit 44 feeds the data "denominator" to the pixel specifying unit 41.

The intensity interpolating unit 45 interpolates at least either of the scattered ray intensities (scattered X-ray intensities) at the predetermined pixels and the direct ray intensities (direct X-ray intensities) at the predetermined pixels estimated by the intensity estimating unit 44. In this embodiment, the intensity interpolating unit 45 interpolates transmission scattered ray intensities Sc or the estimated direct ray intensities P estimated by the intensity estimating unit 44, and feeds the interpolated intensities to the rate of change calculating unit 46 and display unit 5.

Using the intensities estimated by the intensity estimating unit 44 based on the actual measurement in the presence of a subject M, the rate of change calculating unit 46 calculates a value of each pixel from an average value or smoothing and interpolating calculations, as reference intensity about all the pixels relating to the intensities, and calculates a rate of change of each pixel relative to the calculated value. This is reflected in the X-ray imaging of different subjects M, using the rates of change estimated by the intensity estimating unit 44, or the rates of change interpolated by the rate of change interpolating unit 47. In this embodiment, rates of change (indicated "Rcs" in FIG. 4) are calculated using the transmission scattered ray intensities Sc estimated by the intensity estimating unit 44 and the transmission scattered ray intensities Sc interpolated by the intensity interpolating unit 45, and are fed to the intensity estimating unit 44 again.

The estimation selecting unit 48, when the direct ray transmittances Cp have a predetermined value or more, estimates estimated direct ray intensities P using the actual measurement intensities G obtained by actual measurement and the direct ray transmittance Cp, and when the direct ray transmittances Cp have values less than the predetermined value, estimates estimated direct ray intensities P by interpolating calculation of estimated direct ray intensities P estimated for surrounding pixels. In this embodiment, when the direct ray transmittances Cp have the predetermined value or more, the estimated direct ray intensities P estimated by the intensity estimating unit 44 in step S7 (see FIG. 5) described hereinafter are used as they are, and there is no need to estimate intensities again. In this embodiment, when the direct ray transmittances Cp have values less than the predetermined value, interpolating calculations are carried out using the estimated direct ray intensities P of the surrounding pixels provided by the intensity interpolating unit 45, and the estimated direct ray intensities P acquired by the interpolating calculations are adopted as estimated direct ray intensities P which should finally be obtained.

In this embodiment, an actual X-ray imaging follows a procedure as shown in FIG. 5.

(Step S1) Actual Measurement without Subject

X-ray imaging is carried out in the absence of a subject. As shown in FIG. 6, X-rays are emitted from the X-ray tube 2 toward the grid 6 and FPD 3 with no subject interposed between the X-ray tube 2 and grid 6, thereby to carry out X-ray imaging for actual measurement without a subject. That is, the X-ray tube 2 emits X-rays in the absence of a subject, to be incident on the FPD 3 through the grid 6, thereby obtaining actual measurement data without a subject. Specifically, the detecting elements d of the FPD 3 (see FIG. 3) read the X-rays as converted to electric signals without a subject, and provide pixel values corresponding to the electric signals.

(Step S2) Calculation and Interpolation of Direct Ray Transmittances

The pixel values are equivalent to the intensities after transmission through the grid 6 which are obtained by actual measurement without a subject. On the other hand, the intensity before transmission through the grid 6 is known. The direct ray transmittances Cp are expressed by ratios between the intensity before transmission through the grid 6 and the intensities after transmission through the grid 6 (that is, the pixel values detected by the FPD 3).

Thus, the intensities after transmission through the grid 6 which are equivalent to the pixel values obtained from the FPD 3 and the known intensity before transmission through the grid 6 are fed to the transmittance calculating unit 42. The transmittance calculating unit 42 calculates the direct ray transmittances Cp expressed by the ratios between the intensity before transmission and the intensities after transmission through the grid 6. The transmittance calculating unit 42 calculates such direct ray transmittances Cp with respect to the discrete distances between the X-ray tube 2 and the grid 6/FPD 3. Since the grid 6 and FPD 3 are arranged close to each other, the distance between the X-ray tube 2, grid 6 and FPD 3 is a distance (SID: Source Image Distance) from the focus of the X-ray tube 2 to the detecting plane (incidence plane) of the FPD 3.

The distance SID from the focus of the X-ray tube 2 to the detecting plane of the FPD 3 varies in actual X-ray imaging as shown in FIG. 6. Then, X-ray imaging is carried out similarly without a subject, and the transmittance calculating unit 42 obtains a direct ray transmittance Cp for each of discrete distances $L_{s+1}$, $L_{s+2}$, $L_{s+3}$ and so on as shown in black dots in FIG. 7. The direct ray transmittances Cp for the discrete distances $L_{s+1}$, $L_{s+2}$, $L_{s+3}$ and so on are fed to the transmittance interpolating unit 43, intensity estimating unit 44 and estimation selecting unit 48. The transmittance calculating unit 42 obtains a direct ray transmittance Cp for each pixel also, and feeds it to the transmittance interpolating unit 43, intensity estimating unit 44 and estimation selecting unit 48.

The transmittance interpolating unit 43 interpolates the direct ray transmittances Cp calculated by the transmittance calculating unit 42 in distances around the discrete distances $L_{s+1}$, $L_{s+2}$, $L_{s+3}$ and so on. The results of the interpolation are, for example, as shown in the solid line in FIG. 7. As a method of interpolation, a value acquired from an arithmetic average (additive average) or geometric average of two direct ray transmittances Cp with respect to adjoining discrete distances (e.g. $L_{s+1}$ and $L_{s+2}$) may be used as direct ray transmittance Cp for the distance between the above adjoining discrete distances. Lagrange interpolation may be used. Or an approximate expression of the solid line in FIG. 7 obtained from the least square method may be used to determine, as direct ray transmittance Cp, a value corresponding to a distance on the solid line. Thus, any commonly used method of interpolation may be employed. The direct ray transmittances Cp interpolated by the transmittance interpolating unit 43 are fed to the intensity estimating unit 44 and estimation selecting unit 48.

(Step S3) Actual Measurement with Phantom

Next, X-ray imaging is carried out in the presence of a subject M. As shown in FIG. 8, acting as the subject M is a phantom Ph in the form of a flat acrylic plate regarded as providing a fixed thickness for direct ray transmission, or the same value of estimated direct ray intensity P for all the pixels. Instead, a water column may be used as phantom Ph.

Returning to the description of this embodiment, X-rays are emitted from the X-ray tube 2 toward the grid 6 and FPD 3 with the acrylic plate phantom Ph interposed between the X-ray tube 2 and grid 6, thereby to carry out X-ray imaging for actual measurement in the presence of the phantom Ph. That is, the X-ray tube 2 emits X-rays in the presence of the subject, to be incident on the FPD 3 through the grid 6, thereby obtaining actual measurement intensities G with the phantom Ph, which intensities G are intensities after transmission through the grid 6 in actual measurement. Specifically, the detecting elements d of the FPD 3 (see FIG. 3) read the X-rays as converted to electric signals in the presence of phantom Ph, and provide pixel values corresponding to the electric signals.

(Step S4) Estimation and Interpolation of Intensities

The pixel values are equivalent to the actual measurement intensities G after transmission through the grid 6 which are obtained by actual measurement with the phantom Ph. On the other hand, the pixel specifying unit 41 specifies the three adjoining pixels (n−1), n and (n+1) as a combination of three pixels as noted hereinbefore. Based on the direct ray transmittances Cp calculated by the transmittance calculating unit 42, the direct ray transmittances Cp interpolated by the transmittance interpolating unit 43, and the actual measurement intensities G equivalent to the pixel values from the FPD 3, the intensity estimating unit 44 estimates transmission scattered ray intensities Sc and estimated direct ray intensities P at the three adjoining pixels (n−1), n and $(n+_1)$ specified by the pixel specifying unit 41.

The actual measurement intensities G are obtained from the actual measurement in step S3, and are known. The direct ray transmittances Cp are obtained from the actual measurement in step S1 and calculated and interpolated in step S2, and are known. On the other hand, the transmission scattered ray intensities Sc and estimated direct ray intensities P are values to be estimated by the intensity estimating unit 44, and are unknown at this point of time. Then, the intensity estimating unit 44 estimates transmission scattered ray intensity Sc and estimated direct ray intensity P by solving simultaneous equations for each of the three adjoining pixels (n−1), n and (n+1).

For the three adjoining pixels (n−1), n and (n+1), the actual measurement intensities G are set to $G_{n-1}$, $G_n$ and $G_{n+1}$, the direct ray transmittances Cp to $Cp_{n-1}$, $Cp_n$ and $Cp_{n+1}$, the transmission scattered ray intensities Sc to $Sc_{n-1}$, $Sc_n$ and $Sc_{n+1}$, and the estimated direct ray intensities P to $P_{n-1}$, $P_n$ and $P_{n+1}$. The transmission scattered ray intensity Sc varies among the three adjoining pixels due to nonuniformity of the grid 6 (scattered radiation removing device), for example. Taking this into consideration, transmission scattered ray intensities Sc at the adjoining pixels are obtained by interpolating calculation. In this embodiment, it is assumed that variations in the transmission scattered ray intensity Sc within the three adjoining pixels (n−1), n and (n+1) can be linearly approximated as in the following the equation (1):

$$Sc_n=(Sc_{n+1}+Sc_{n-1})/2 \tag{1}$$

As a method of interpolating the transmission scattered ray intensities Sc, Lagrange interpolation, for example, may be used as noted in connection with the interpolation of the direct ray transmittances Cp. The method is not limited to equation (1) above, but any commonly used method of interpolation may be employed.

The actual measurement intensities G are expressed by the following simultaneous equations (2)-(4) for the three adjoining pixels (n−1), n and (n+1), showing that each actual measurement intensity G is equal to a sum of the product of estimated direct ray intensity P and direct ray transmittance Cp, and transmission scattered ray intensity Sc:

$$G_{n+1}=P_{n+1}\cdot Cp_{n+1}+Sc_{n+1} \tag{2}$$

$$G_n=P_n\cdot Cp_n+Sc_n \tag{3}$$

$$G_{n-1}=P_{n-1}\cdot Cp_{n-1}+Sc_{n-1} \tag{4}$$

Since the acrylic plate used as phantom Ph is formed to have a fixed thickness for direct ray transmission as noted hereinbefore, the estimated direct ray intensities P are equal among the three adjoining pixels as expressed by the following equation (5):

$$P_{n-1}=P_n=P_{n+1} \quad (5)$$

Thus, the pixel specifying unit 41 determines the number of certain pixels to be specified, according to the known number of known direct ray transmittances Cp and the known number of known actual measurement intensities G when estimating the unknown transmission scattered ray intensities Sc and direct ray intensities P at the three adjoining pixels (n−1), n and (n+1) specified by the pixel specifying unit 41. The intensity estimating unit 44 will estimate the transmission scattered ray intensities Sc and direct ray intensities P by solving the simultaneous equations relating to the actual measurement intensities G, direct ray transmittances Cp, transmission scattered ray intensities Sc and estimated direct ray intensities P for the certain pixels determined, respectively.

In the above equation (1), the transmission scattered ray intensity Sc at each pixel is obtained by interpolating calculation of transmission scattered ray intensities Sc at the adjoining pixels, and therefore the number of unknowns can be reduced by one. On the other hand, since the above equation (5) shows that the estimated direct ray intensities P are equal among the three adjoining pixels, the number of unknowns is reduced to one. Therefore, apart from the above equations (1) and (5), it is sufficient to form simultaneous equations corresponding to the number of pixels specified. In this case, the simultaneous equations can be solved once the pixel specifying unit 41 specifies only an arbitrary number. In this embodiment, the number is set to three, and simultaneous equations are formed as the above equations (2)-(4).

By solving simultaneous equations obtained from such equations (1)-(5) noted above, the estimated direct ray intensity $P_n$ ($=P_{n+1}=P_{n-1}$), transmission scattered ray intensities $Sc_{n-1}$, $Sc_n$ and $Sc_{n+1}$ are calculated as in the following equations (6)-(9):

$$P_n=(G_{n+1}+G_{n-1}-2G_n)/(Cp_{n+1}+Cp_{n-1}-2Cp_n) \quad (6)$$

$$Sc_{n+1}=G_{n+1}-P_{n+1}\cdot Cp_{n+1} \quad (7)$$

$$Sc_{n+1}=G_{n+1}-P_{n+1}\cdot Cp_n \quad (8)$$

$$Sc_{n-1}=G_{n-1}-P_{n-1}\cdot Cp_{n-1} \quad (9)$$

In equations (6)-(9) above, the estimated direct ray intensity P is first derived from the above equation (6) using the known actual measurement intensities $G_{n-1}$, $G_n$ and $G_{n+1}$ and known direct ray transmittances $Cp_{n-1}$, $Cp_n$ and $Cp_{n+1}$. After making the estimated direct ray intensity P known, transmission scattered ray intensities $Sc_{n-1}$, $Sc_n$ and $Sc_{n+1}$ are derived from the above equations (7)-(9) using also the estimated direct ray intensity $P_n$($=P_{n+1}=P_{n-1}$) now known.

When the combination of three adjoining pixels (n−1), n, and (n+1) is made one group in this way, one estimated direct ray intensity $P_n$ can be found for each group. As described in relation with the above equation (5), the estimated direct ray intensities $P_n$ should essentially have the same value for all the groups, each consisting of three pixels. In practice, however, variations occur under the influence of transmittance variations of scattered rays in peripheral portions of the grid 6, or due to statistical fluctuation errors. In order to reduce the influence of such installation state of the grid 6 or statistical fluctuation errors, an average value of estimated direct ray intensities $P_n$ is obtained from central portions with little experimental errors. When, for example, minor variations occur in the above peripheral portions of the grid 6, the estimated direct ray intensities $P_n$ are obtained, using the above equation (6), for a plurality of groups in central portions of the grid 6, each group consisting of a combination of three pixels (n−1), n and (n+1), and an average value $P^\wedge$ thereof is obtained. The average value $P^\wedge$ is substituted into each of the above equations (2)-(4) (that is, substituted into the following equations (10)-(12) transformed from the above equations (7)-(9)), and the transmission scattered ray intensities $Sc_{n-1}$, $Sc_n$ and $Sc_{n+1}$ are calculated again for all the groups.

$$Sc_{n+1}=G_{n+1}-P^\wedge\cdot Cp_{n+1} \quad (10)$$

$$Sc_n=G_n-P^\wedge\cdot Cp_n \quad (11)$$

$$Sc_{n-1}=G_{n-1}-P^\wedge\cdot Cp_{n-1} \quad (12)$$

Thus, the intensity estimating unit 44 makes estimations by deriving the transmission scattered ray intensities $Sc_{n-1}$, $Sc_n$ and $Sc_{n+1}$ from the above equations (10)-(12). The transmission scattered ray intensities $Sc_{n-1}$, $S_n$ and $Sc_{n+1}$ estimated by the intensity estimating unit 44 are fed to the intensity interpolating unit 45, rate of change calculating unit 46 and display 5.

Directing attention to the denominator included in the solution of the above simultaneous equations (1)-(5), it is "$Cp_{n+1}+Cp_{n-1}-2Cp_n$" in this embodiment as seen from the above equation (6). The denominator is "$Cp_{n+1}+Cp_{n-1}-2Cp_n$" even when the above equation (6) is substituted into the above equations (7)-(9). When the absolute value of the denominator "$Cp_{n+1}+Cp_{n-1}-2Cp_n$" is a certain value or less, there is a possibility that these simultaneous equations cannot be solved.

Particularly when the denominator "$Cp_{n+1}+Cp_{n-1}-2Cp_n$" is "0", the above simultaneous equations (1)-(5) cannot be solved. When the denominator "$Cp_{n+1}+Cp_{n-1}-2Cp_n$" is "0", that is when the direct ray transmittance $Cp_n$ at the middle pixel of the adjoining pixels is an arithmetical average of direct ray transmittances $Cp_{n+1}$ and $Cp_{n-1}$ of the other pixels ($Cp_{n+1}+Cp_{n-1}-2Cp_n=0$, i.e. $Cp_n=(Cp_{n+1}+Cp_{n-1})/2$), the simultaneous equations cannot be solved if the pixel specifying unit 41 selects the three pixels (n−1), n, and (n+1) as the combination for the simultaneous equations at that time. When the denominator "$Cp_{n+1}+Cp_{n-1}-2Cp_n$" is "0", the pixel specifying unit 41, preferably, does not select the three pixels (n−1), n and (n+1) as the combination for the simultaneous equations, but selects three different pixels (n'−1), n' and (n'+1) (e.g. pixels n, (n+1) and (n+2), or pixels (n−2), (n−1) and n) as the combination. Then, the above simultaneous equations (1)(5) of the three different pixels (n'−1), n' and (n'+1) specified are solved.

With the pixels specified as described above, the simultaneous equations can be solved, and using the estimated direct ray intensities $P_n$, an average value of the estimated direct ray intensities $P_n$ is obtained by the above method. Once average value $P^\wedge$ of the estimated direct ray intensities $P_n$ is obtained, transmission scattered ray intensities $Sc_{n-1}$, $Sc_n$ and $Sc_{n+1}$ of the three pixels (n−1), n and (n+1) forming the combination when the denominator "$Cp_{n+1}+Cp_{n-1}-2Cp_n$" is "0" can also be derived from the above equations (10)-(12).

To summarize the description about solving the simultaneous equations, the estimated direct ray intensities $P_n$ ($=P_{n+1}=P_{n-1}$) when the denominator "$Cp_{n+1}+Cp_{n-1}-2Cp_n$" is not "0" are derived from the above equation (6), and average value $P^\wedge$ is obtained. The average value $P^\wedge$ is substituted into the above equations (10)-(12) to obtain the transmission scattered ray intensities $Sc_{n-1}$, $Sc_n$ and $Sc_{n+1}$ when the denominator "$Cp_{n+1}+Cp_{n-1}-2Cp_n$" is not "0". The transmission scattered ray intensities $Sc_{n-1}$, $Sc_n$ and $Sc_{n+1}$ when the denominator "$Cp_{n+1}+Cp_{n-1}-2Cp_n$" is "0" can also be obtained by similar substitution into the above equations (10)-(12). In this way, the estimated direct ray intensities P when the denominator "$Cp_{n+1}+Cp_{n-1}-2Cp_n$" is not "0" are first obtained to obtain average value P^. Then, the average value P^ is used to obtain the transmission scattered ray intensities $Sc_{n-1}$, $Sc_n$ and $Sc_{n+1}$ when the denominator "$Cp_{n+1}+Cp_{n-1}-2Cp_n$" is not "0", and the transmission scattered ray intensities $Sc_{n-1}$, $Sc_n$ and $Sc_{n+1}$ when the denominator "$Cp_{n+1}+Cp_{n-1}-2Cp_n$" is "0" are obtained similarly.

(Step S5) Calculation and Interpolation of Rates of Change

The rate of change calculating unit 46 calculates rates of change Rcs using the transmission scattered ray intensities Sc ($Sc_{n-1}$, $Sc_n$ and $Sc_{n+1}$) estimated by the intensity estimating unit 44. Specifically, an average value Sc^ is obtained, or values Sc~ of pixels are obtained by smoothing and interpolating calculations, in order to determine the rates of change Rcs of the pixels relative to the values of all the pixels as reference intensities of the transmission scattered ray intensities Sc. Assuming that a ratio between the transmission scattered ray intensity $Sc_n$ of each pixel and the average value Sc^ or the value Sc~ of each pixel is a rate of change Rcs, and that $Rcs_n$ represents the rate of change Rcs of each pixel, $Rcs_n$ is expressed by the following equation (13):

$$Rcs_n=Sc_n/Sc\hat{}$$

or $$Rcs_n=Sc_n/Sc\sim \tag{13}$$

A reference estimated scattering intensity used as the denominator when calculating the rates of change of transmission scattered rays corresponds to scattered ray intensity in the case of an ideal grid with no distortion of the foil strips or not dependent on installation conditions.

As a method therefor may use:

1) an average value by simply approximating a scattered ray intensity distribution two-dimensionally fixed; or 2) a value acquired by two-dimensionally smoothing and interpolating the estimated scattered ray intensity of each pixel, by strictly taking into consideration scattered ray intensity variations due to installation conditions, such as the shape of the phantom and peripheral portions of the grid. The average value of 1) can be said the simplest method of smoothing and interpolating calculations.

Thus, variations of transmission scattered ray intensity Sc, for which installation conditions of the grid 6 relating to deformation of the absorbing foil strips 6*a*, for example, are considered by using the ratio relative to the reference value, are expressed by the rates of change $Rcs_n$. The rate of change calculating unit 46 calculates the rates of change $Rcs_n$ for all the pixels. The rate of change interpolating unit 47 interpolates, as necessary, the rates of change $Rcs_{n-1}$, $Rcs_n$ and $Rcs_{n+1}$ calculated by the rate of change calculating unit 46, and then feeds the rates of change to the intensity estimating unit 44 again.

The rate of change Rcs, as does the direct ray transmittance Cp, varies for each of the discrete distances $L_{s+1}$, $L_{s+2}$ and $L_{s+3}$ as shown in black squares in FIG. 7. The rate of change interpolating unit 47 interpolates the rates of change Rcs calculated by the rate of change calculating unit 46 in distances around the discrete distances $L_{s+1}$, $L_{s+2}$ and $L_{s+3}$ and so on. The results of the interpolation are, for example, as shown in the dotted line in FIG. 7. As a method of interpolation, a value acquired from an arithmetic average (additive average) or geometric average of two rates of change Rcs with respect to adjoining discrete distances (e.g. $L_{s+1}$ and $L_{s+2}$) may be used as rate of change Rcs for the distance between the above adjoining discrete distances. Lagrange interpolation may be used. Or an approximate expression of the dotted line in FIG. 7 obtained from the least square method may be used to determine, as rate of change Rcs, a value corresponding to a distance on the dotted line. Thus, any commonly used method of interpolation may be employed.

(Step S6) Actual Measurement with Real Subject

Next, X-ray imaging is carried out in the presence of a subject M other than the subject M (phantom Ph) used in steps S3-S5. As shown in FIG. 1, a real subject M is used for actual X-ray imaging. X-rays are emitted from the X-ray tube 2 toward the grid 6 and FPD 3 with the real subject M interposed between the X-ray tube 2 and grid 6, thereby to carry out X-ray imaging for actual measurement with the real subject M. That is, the X-ray tube 2 emits X-rays in the presence of the real subject M (i.e. subject M for use in actual X-ray imaging), to be incident on the FPD 3 through the grid 6. In this way, actual measurement intensities G which are intensities after transmission through the grid 6 in the actual measurement in the presence of the subject M are obtained as in step S3. Specifically, the detecting elements d of the FPD 3 (see FIG. 3) read the X-rays as converted to electric signals in the presence of the subject M, and provide pixel values corresponding to the electric signals.

(Step S7) Estimation and Interpolation of Intensities

As noted in step S4, the pixel values are equivalent to the actual measurement intensities G after transmission through the grid 6 which are obtained by actual measurement with the subject M. Similarly, the pixel specifying unit 41 specifies the three adjoining pixels (n−1), n and (n+1) as a combination of three pixels. Based on the rates of change Rcs calculated by the rate of change calculating unit 46 or rates of change Rcs interpolated by the rate of change interpolating unit 47, the direct ray transmittances Cp calculated by the transmittance calculating unit 42 or the direct ray transmittances Cp interpolated by the transmittance interpolating unit 43, and the actual measurement intensities G equivalent to the pixel values from the FPD 3, the intensity estimating unit 44 again estimates transmission scattered ray intensities Sc and estimated direct ray intensities P at the three adjoining pixels (n−1), n and (n+1) specified by the pixel specifying unit 41.

As in step S4, the transmission scattered ray intensities Sc and estimated direct ray intensities P are estimated by solving simultaneous equations. Differences to step S4 lie in that a parameter consisting of the rates of change Rcs is taken into consideration, and that the equations concerning the transmission scattered ray intensities Sc and estimated direct ray intensities P are different. The aspects common to step S4 will not be described.

In step S7, the transmission scattered ray intensities Sc are transmission scattered ray intensities where there is no foil nonuniformity such as deformation of the absorbing foil strips of the grid 6 and the installation condition is ideal. The transmission scattered ray intensities Sc vary smoothly where, apart from the rates of change due to nonuniformity of the grid 6, the subject is a water column or a human body and the radiation is X-rays or gamma rays. Thus, the transmission scattered ray intensities Sc are considered equal among the three adjoining pixels, as expressed by the following equation (1)".

$$Sc_{n-1}=Sc_n=Sc_{n+1} \tag{1"}$$

The actual measurement intensities G are expressed by the following simultaneous equations (2)"-(4)" for the three adjoining pixels (n−1), n and (n+1), showing that each actual measurement intensity G is equal to a sum of the product of estimated direct ray intensity P and direct ray transmittance Cp, and the product of transmission scattered ray intensity Sc and rate of change Rcs:

$$G_{n+1}=P_{n+1}\cdot Cp_{n+1}+Sc_{n+1}\cdot Rcs_{n+1} \quad (2)''$$

$$G_{n}=P_{n}\cdot Cp_{n}+Sc_{n}\cdot Rcs_{n} \quad (3)''$$

$$G_{n-1}=P_{n-1}\cdot Cp_{n-1}+Sc_{n-1}\cdot Rcs_{n-1} \quad (4)''$$

As distinct from the case of the phantom Ph in the form of an acrylic plate in step S3, the estimated direct ray intensity P at each pixel is variable due to the shape and material of the subject M. The variations can be expressed by interpolating calculations of the estimated direct ray intensities P at adjoining pixels. In this embodiment, it is assumed that the variations in the estimated direct ray intensities P within the three adjoining pixels (n−1), n and (n+1) can be linearly approximated as in the following the equation (5)":

$$P_{n}=(P_{n+1}+P_{n-1})/2 \quad (5)''$$

As a method of interpolating the estimated direct ray intensities P, Lagrange interpolation, for example, may be used as noted in connection with the interpolation of the direct ray transmittances Cp and the interpolation of transmission scattered ray intensities Sc in step S4. The method is not limited to equation (5)" above, but any commonly used method of interpolation may be employed.

By solving simultaneous equations obtained from such equations (1)"-(5)" noted above, the estimated direct ray intensities $P_{n-1}$, $P_n$ and $P_{n+1}$, transmission scattered ray intensity $Sc_n$ ($=Sc_{n+1}=Sc_{n-1}$) are calculated as in the following equations (6)"-(9)":

$$Sc_{n}=G_{n+1}/Rcs_{n+1}-\{(Cp_{n}\cdot Rcs_{n-1}-2Cp_{n-1}\cdot Rcs_{n})\cdot G_{n+1}+2Cp_{n-1}\cdot Rcs_{n+1}\cdot G_{n}-Cp_{n}\cdot Rcs_{n+1}\cdot G_{n-1}\}/(Cp_{n+1}\cdot Cp_{n}\cdot Rcs_{n+1}\cdot Rcs_{n-1}\cdot 2Cp_{n+1}\cdot Cp_{n-1}\cdot Rcs_{n+1}\cdot Rcs_{n}+Cp_{n}\cdot Cp_{n-1}\cdot Rcs_{n+1}{}^{2}) \quad (6)''$$

$$P_{n-1}=(G_{n-1}-Sc_{n}\cdot Rcs_{n-1})/Cp_{n-1} \quad (7)''$$

$$P_{n}=(G_{n}-Sc_{n}\cdot Rcs_{n})/Cp_{n} \quad (8)''$$

$$P_{n+1}=(G_{n+1}-Sc_{n}\cdot Rcs_{n+1})/Cp_{n+1} \quad (9)''$$

The estimated direct ray intensities $P_{n-1}$, $P_n$ and $P_{n+1}$ and transmission scattered ray intensity $Sc_n$ ($=Sc_{n+1}=Sc_{n-1}$) derived from the above equations (6)"–(9)" are values calculated when the denominator ($Cp_{n+1}\cdot Cp_n\cdot Rcs_{n+1}\cdot Rcs_{n-1}-2Cp_{n+1}\cdot Cp_{n-1}\cdot Rcs_{n+1}\cdot Rcs_n+Cp_n\cdot Cp_{n-1}\cdot Rcs_{n+1}{}^2$) included in the solution of the above simultaneous equations (1)"-(5)" is not "0".

When the denominator included in the solution of the above simultaneous equations (1)"-(5)" is "0", the above simultaneous equations (1)"-(5)" cannot be solved. Thus, with the three pixels (n−1), n and (n+1) forming the combination resulting in the denominator "0", the estimated direct ray intensities $P_{n-1}$, $P_n$ and $P_{n+1}$ or the transmission scattered ray intensities $Sc_{n-1}$, $Sc_n$ and $Sc_{n+1}$ cannot be calculated, and thus cannot be estimated. There are the following methods 1) and 2), for example, for estimating the estimated direct ray intensities $P_{n-1}$, $P_n$ and $P_{n+1}$ and the transmission scattered ray intensities $Sc_{n-1}$, $Sc_n$ and $Sc_{n+1}$ in the case of the three pixels (n−1), n and (n+1) forming the combination resulting in the denominator "0".

The method 1) determines the transmission scattered ray intensities Sc first. Since the transmission scattered ray intensities Sc assume that there is no deformation of the absorbing foil strips of the grid 6 and the installation condition is ideal, a plurality of transmission scattered ray intensities $Sc_n$ acquired when the denominator is not "0" are first used in appropriate smoothing and interpolating calculations to obtain transmission scattered ray intensities $Sc_n$~ for all the pixels, including those pixels for which the transmission scattered ray intensities Sc are not yet obtained because the denominator is "0". As noted in connection with the above equation (1)", variations are smooth where the subject is a water column or a human body and the radiation is X-rays or gamma rays. And smoothing is effective in reducing variations due to statistical fluctuation errors. Thus, the values $Sc_n$~ obtained are close to the true values of transmission scattered ray intensities $Sc_n$. The transmission scattered ray intensities $Sc_n$~ obtained in this way are substituted into the above equation (3) for all the pixels, thereby obtaining the estimated direct ray intensities $P_n$ directly. As noted above, this method provides a great advantage of causing no deterioration in the resolution of images of the estimated direct ray intensities $P_n$ since smoothing and interpolating calculations are not carried out from the values of the pixels for which the denominator is not "0".

The method 2) is a method of interpolating estimated direct ray intensities $P_{n-1}$, $P_n$ and $P_{n+1}$ not yet obtained, as in equation (5)" above, using the estimated direct ray intensities $P_{n-1}$, $P_n$ and $P_{n+1}$ already derived from equations (7)"-(9)" above. That is, the intensity interpolating unit 45 interpolates the estimated direct ray intensities $P_{n-1}$, $P_n$ and $P_{n+1}$ estimated by the intensity estimating unit 44. This interpolation, as long as it is a usual interpolation, is not limited to the foregoing equation (5)". Thus, in step S7, estimated direct ray intensities $P_n$ and transmission scattered ray intensities $Sc_n$ are acquired for all the pixels.

(Step S8) Selection of Estimation of Direct Ray Intensities

The estimation selecting unit 48 estimates the estimated direct ray intensity $P_n$ of each pixel obtained in step S7 above, as follows. The estimation selecting unit 48 checks the values of direct ray transmittances $Cp_n$ derived from equations (7)"-(9)" above, and when the direct ray transmittances $Cp_n$ have a predetermined value or more (see the following equation (16), for example), adopts the estimated direct ray intensities $P_n$ obtained using the actual measurement intensities $G_n$ and direct ray transmittances $Cp_n$ in step S7 as estimated direct ray intensities $P_n$ which should finally be obtained. When the direct ray transmittances $Cp_n$ have values less than the predetermined value, the estimation selecting unit 48 selects an estimating method using interpolating calculations of the estimated direct ray intensities $P_{n-1}$ and $P_{n+1}$ at adjoining pixels (n−1) and (n+1), in place of the estimated direct ray intensities $P_n$ obtained in step S7, and adopts estimated direct ray intensities $P_n$ obtained by this method as estimated direct ray intensities $P_n$ which should finally be obtained.

As an interpolating method, the foregoing equation (5)"=($P_{n+1}+P_{n-1}$)/2) may be used. However, as an interpolating method for the estimated direct ray intensities $P_n$, Lagrange interpolation, for example, may be used in the same way as in step S7. The method is not limited to the foregoing equation (5)", but any commonly used method of interpolation may be employed. In the case of Lagrange interpolation, the interpolation uses not only the adjoining pixels, but surrounding pixels also.

The predetermined value noted above is set to such a value that a statistical fluctuation error of estimated direct ray intensities $P_n$ acquired using the actual measurement intensity $G_n$ and direct ray transmittances $Cp_n$ become within clinically permissible values. Where $\Delta P_n$ is a statistical fluctuation error of estimated direct ray intensities $P_n$, $\Delta G_n$ is a statistical fluctuation error of actual measurement intensities $G_n$, and $\Delta Sc_n$ is a statistical fluctuation error of transmission scattered ray intensities $Sc_n$, the statistical fluctuation error $\Delta P_n$ of estimated direct ray intensities $P_n$, from the foregoing equation (8)", can be evaluated as in the following equation (14) using the statistical fluctuation error $\Delta G_n$ of actual measurement intensities $G_n$ and the statistical fluctuation error $\Delta Sc_n$ of transmission scattered ray intensities $Sc_n$:

$$\Delta P_n^2 = \{(\Delta G_n)^2 + (Rcs_n \cdot \Delta Sc_n)^2\}/Cp_n^2 \quad (14)$$

Here, an amount of variation between adjacent pixels of "$Rcs_n \cdot \Delta Sc_n$" at the right side of equation (14) above has a negligible contribution, since the transmission scattered ray intensities $Sc_n$ are substantially constant, and the amount of variation of the rate of change $Rcs_n$ is small compared with the direct ray transmittances $Cp_n$. Thus, the following equation (15) may be formed:

$$\Delta P_n = \Delta G_n / Cp_n \quad (15)$$

This embodiment employs an air grid as the scattered ray removing grid. Since the air grid has no intermediate substance, the absorbing foil strips 6*a* can be distorted. Particularly where the absorbing foil strips 6*a* are inclined from the direction of movement of the direct rays, the values of transmittance of the direct rays (direct ray transmittances) will fall. At the standard SID ($SID_0$) also, the value of direct ray transmittance Cp may partially become small. Even when there is hardly any distortion of the absorbing foil strips 6*a*, in a position $SID_P$ with the X-ray focal point having moved to P as shown in FIG. 6, the inclination from the direction of movement of the direct rays becomes large especially near the ends in the Y-direction of the grid 6 (see FIG. 3), to reduce the values of direct ray transmittance Cp. For pixels with such small values of direct ray transmittance Cp, the statistical fluctuation of $\Delta G_n$ is amplified by the surrounding pixels from the above equation (15).

As shown in FIG. 9, shadows 31 of the absorbing foil strips 6*a* are formed on the FPD 3 as a result of the absorbing foil strips 6*a* absorbing X-rays. The shadows 31 have small widths adjacent a standard position where a normal extends from the focus of the X-ray tube 2 to the FPD 3. Of the peripheral positions of the grid 6, near the ends in the Y-direction of the grid 6 (see FIG. 3) as noted above, the shadows 31 have large widths because of the large inclination from the direction of movement of the direct rays. Therefore, the farther away from the standard position in the Y-direction, the width of shadow 31 becomes the larger, and the value of direct ray transmittance Cp becomes the smaller.

In order to make the statistical fluctuations of intensity values in the image area at least equivalent, when the convergence grid, including such pixels, is compared with an ordinary grid, the value of direct ray transmittance $Cp_n$ as in the following expression (16) is required for the air grid in this embodiment:

$$Cp_n \geqq Th \quad (16)$$

Th is a predetermined value set by the operator taking account of direct ray transmittances $Cp_n$ of other pixels in the image area. As noted hereinbefore, the direct ray transmittances $Cp_n$ have a value of one or less. The direct ray transmittance $Cp_n$ becomes 0.8 in the standard position in geometric calculation when spacing Wd between the pixels is 0.15 mm, and the width of shadow 31 is 0.03 mm. Actual direct ray transmittance $Cp_n$ becomes about 0.6 to 0.7 which is smaller than design direct ray transmittance $Cp_n$, due to a design error such as a displacement caused by deformation of the absorbing foil strips 6*a*. In this embodiment, the predetermined value Th is set to 0.4. This value may be varied according to the spacing Wd between the pixels, the width of shadow 31, or application of the apparatus.

As described above, the foregoing expression (16) serves as criterion for the estimation selecting unit 48. When the value of direct ray transmittance $Cp_n$ is equal or higher than the predetermined value Th ($Cp_n \geqq Th$), the estimated direct ray intensity $P_n$ obtained in step S7 is employed. When the value of direct ray transmittance $Cp_n$ is less than the predetermined value Th ($Cp_n < Th$), as described hereinbefore, the estimating method using interpolating calculations of the estimated direct ray intensities $P_{n-1}$ and $P_{n+1}$ at adjoining pixels (n−1) and (n+1) is selected in place of the estimated direct ray intensity $P_n$ obtained in step S7, and an estimated direct ray intensity $P_n$ obtained by this method is adopted as estimated direct ray intensity $P_n$ which should finally be obtained.

Thus, when the value of direct ray transmittance $Cp_n$ is equal or higher than the predetermined value Th, that is when a statistical error is permissible, the estimated direct ray intensity $P_n$ is obtained from the actual measurement intensity $G_n$ at each pixel. X-ray intensities of spacing Wd between the pixels (i.e. pixel pitch) can be determined accurately to obtain a high resolution image. When the value of direct ray transmittance $Cp_n$ is less than the predetermined value Th, that is when a statistical error is impermissible, the estimated direct ray intensity $P_n$ is derived from interpolating calculations of adjoining pixels with small statistical error variations. Thus, although resolution is slightly lowered, the statistical fluctuation error is held down to a permissible value.

The estimation selecting unit 48 feeds the estimated direct ray intensities $P_{n-1}$, $P_n$ and $P_{n+1}$ selected in step S8 to the display 5, for example.

Thus, through steps S1-S8, by using as pixel values the estimated direct ray intensities $P_n$ selected and estimated in step S8, false images due to scattered rays and the grid 6 are reduced, to obtain appropriately an X-ray image having statistical fluctuation errors at all the pixels held down to permissible values. This X-ray image may be outputted to and displayed on the display 5 noted hereinbefore, may be written and stored in a storage medium represented by a RAM (Random-Access Memory) or the like to be read therefrom as necessary, or may be printed out by a printing device represented by a printer.

According to the X-ray imaging apparatus in this embodiment, for pixels with an attenuation of direct X-rays (direct rays) due to the absorbing foil strips 6*a*, direct X-ray intensities (estimated direct ray intensities P in this embodiment) may be estimated as finally obtained intensities for those pixels on an assumption that there are no absorbing foil strips 6*a*. In that case, usually, the estimation is carried out using actual measurement X-ray intensity (actual measurement intensity G in this embodiment) obtained by actual measurement of each pixel concerned and direct ray transmittance Cp (which is a ratio between direct ray intensity before transmission and direct ray intensity after transmission through the grid 6).

When the actual direct ray transmittance Cp at each pixel concerned is smaller than direct ray transmittances Cp at other pixels, the enlargement ratio also becomes larger than at the other pixels, and variations due to a statistical error may also be enlarged by a greater extent than variations at the other pixels, to be conspicuous on the image. Then, the predetermined value Th is set by considering the direct ray transmittances Cp at the other pixels, for example. When the direct ray transmittance Cp at the pixel concerned is equal or higher than the predetermined value Th, the estimated direct ray intensity P is obtained for the pixel concerned, using actual measurement intensity G and direct ray transmittance Cp as in the prior art. When the direct ray transmittance Cp at the pixel concerned is less than the predetermined value Th, the estimated direct ray intensity P is obtained for the pixel concerned, by interpolating calculation of estimated direct ray intensities P at pixels surrounding the pixel concerned.

The estimation selecting unit 48 is provided to select an estimating method based on a predetermined value in this way. When variations due to a statistical error of the pixel concerned are enlarged by a greater extent than variations of the other pixels, and hence a possibility of becoming conspicuous on the image, then the direct ray transmittance Cp at the pixel concerned is considered less than the predetermined value Th, and estimated direct ray intensity P is obtained for the pixel concerned by interpolating calculation of estimated direct ray intensities P at pixels surrounding the pixel concerned. Therefore, even when variations due to a statistical error of the pixel concerned are enlarged by a greater extent than variations of the other pixels, and hence a possibility of becoming conspicuous on the image, estimated direct ray intensity P is obtained for the pixel concerned by interpolating calculation of estimated direct ray intensities P at pixels surrounding the pixel concerned, whereby the error can be inhibited without the pixel value of the pixel concerned being conspicuous relative to the surrounding pixels on the image.

In this embodiment, the surrounding pixels noted above (used in the interpolating calculation), preferably, are pixels (n−1) and (n+1) which adjoin the pixel n concerned, that is when there are sharp variations in the estimated direct X-ray intensities (estimated direct ray intensities P in this embodiment) between the pixels, more exact estimated direct ray intensity P can be obtained by estimating direct X-ray intensity for the pixel n concerned (estimated direct ray intensity $P_n$ in this embodiment) by interpolating calculation of direct X-ray intensities of the adjoining pixels (n−1) and (n+1) (estimated direct ray intensities $P_{n-1}$ and $P_{n+1}$ in this embodiment) having less sharp variations. The interpolating operation is not limited to the adjoining pixels only when interpolation is carried out using parameters of surrounding pixels including the adjoining pixels such as spline interpolation or Lagrange interpolation.

The technique of steps S1-S8 in this embodiment can appropriately obtain an X-ray image with reduced false images due to scattered X-rays (scattered radiation) and grid 6, and with statistical fluctuation errors in all the pixels held down to permissible values, regardless of the type of scattered radiation removing device without being limited to a special grid (e.g. the synchronous grid 6 as in this embodiment). As a result, the technique is applicable not only to the standard SID position but any arbitrary positions of a synchronous convergence grid. A proper X-ray image can be obtained also with a general-purpose scattered radiation removing device. There is no need to estimate intensity for all pixels, but intensity may be estimated only for predetermined particular pixels. Intensity for the other remaining pixels may be determined through interpolation. This provides an advantage of easing and time-saving with respect to arithmetic processes.

[Rate of Change of Direct Ray Transmittance]

Figure 10:
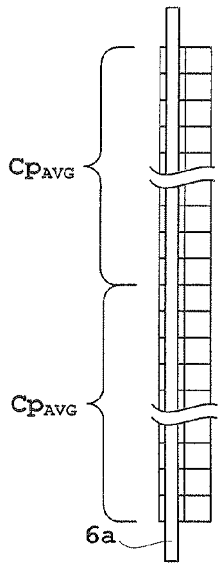
FIG. 10 is a schematic view of pixels and absorbing foil strips for illustrating determination of an average of direct ray transmittances.

Assume that the rate of change of direct ray transmittance is a rate of change of direct ray transmittance $Cp_n$ in the direction along the absorbing foil strips 6*a* (X-direction in FIG. 3). An error will occur in estimating direct ray transmittance $Cp_n$ when, as described above, there are sharp variations in direct ray transmittance $Cp_n$ between the pixels in the direction along the absorbing foil strips 6*a* due to distortion of the absorbing foil strips 6*a*, for example, and the rate of change is large. Usually, in order to eliminate variations due to a statistical error of direct ray transmittance $Cp_n$ in the direction along the absorbing foil strips 6*a*, as shown in FIG. 10, an average of direct ray transmittances $Cp_n$ (written "$Cp_{AVG}$" in FIG. 10) of a predetermined number of pixels (e.g. 20 pixels or 30 pixels) may be calculated, and estimated direct ray intensities $P_n$ may be determined using the average $Cp_{AVG}$.

Therefore, when the rate of change of the direct ray transmittance is large due to distortion of the absorbing foil strips 5*a* and the like, direct ray transmittances $Cp_n$ with extremely large values or extremely small values will falsify the average $Cp_{AVG}$ itself. Images with the extremely large values or extremely small values will appear locally in each pixel area formed of the predetermined number of pixels used for obtaining the average $Cp_{AVG}$. It is to be noted, as mentioned hereinbefore, that the rate of change of the direct ray transmittance is different from the foregoing rate of change Rcs about transmission scattered ray intensity.

Thus, an estimation error will take place with the direct ray transmittances when there are large variations of direct ray transmittances Cp with surrounding pixels, including the pixel concerned, in the direction along the absorbing foil strips 6*a*, that is when the rates of change which are rates about the variations of the direct ray transmittances in the direction along the absorbing foil strips 6*a* are large. Then, the predetermined value Th is set by considering deviations and the like of the direct ray transmittances Cp of the surrounding pixels including the pixel concerned. When the rate of change of direct ray transmittance Cp at each pixel concerned is less than the predetermined value Th, direct X-ray intensity (estimated direct ray intensity P in this embodiment) is estimated for the pixel concerned, using actual measurement intensity (actual measurement intensity G in this embodiment) and direct ray transmittance Cp as in the prior art. When the rate of change of direct ray transmittance at each pixel concerned is equal or higher than the predetermined value Th, estimated direct ray intensity P is obtained for the pixel concerned, by interpolating calculation of estimated direct ray intensities P at the pixels surrounding the pixel concerned.

The estimation selecting unit 48 is provided to select an estimating method based on the predetermined value as described above. When the rate of change is large, and hence a possibility of error in estimating the direct ray transmittance Cp, then the rate of change is considered equal or higher than the predetermined value Th, and estimated direct ray intensity P is obtained for each pixel concerned by interpolating calculation of estimated direct ray intensities P at pixels surrounding the pixel concerned. Therefore, even when the rate of change is large, and hence a possibility of error in estimating the direct ray transmittance Cp, estimated direct ray intensity P is obtained for the pixel concerned by interpolating calculation of estimated direct ray intensities P at pixels surrounding the pixel concerned, whereby the error in estimating the direct ray transmittance Cp can be inhibited.

As described above, what is compared with the predetermined value Th to determine the magnitude is "direct ray transmittance Cp" in the foregoing embodiment, but it is "the rate of change of direct ray transmittance" in this example. The criterion for selecting estimation of direct ray intensity P of the pixel concerned by interpolating calculation of estimated direct ray intensities P at the pixels surrounding the pixel concerned is, in the foregoing embodiment, the case where the direct ray transmittance Cp is less than the predetermined value Th, but in this example, it is the case where the rate of change of direct ray transmittance is equal or higher than the predetermined value Th. Thus, the magnitude relation of predetermined value Th is reversed between the foregoing embodiment and this example. Similarly, the criterion for selecting estimation of direct ray intensity P using actual measurement intensity G and direct ray transmittance Cp as in the prior art is, in the foregoing embodiment, the case where the direct ray transmittance Cp is equal or higher than the predetermined value Th, but in this example, it is the case where the rate of change is less than the predetermined value Th.

As in the foregoing embodiment, the above surrounding pixels (used in the interpolating calculations) may be pixels (n−1) and (n+1) adjoining the pixel n concerned. However, the interpolating operation is not limited to adjoining pixels only, when interpolation is carried out using parameters of surrounding pixels including adjoining pixels such as spline interpolation or Lagrange interpolation.

This invention is not limited to the foregoing embodiments, but may be modified as follows:

(1) The foregoing embodiments have been described taking X-rays as an example of radiation. However, the invention is applicable to radiation other than X-rays (such as gamma rays).

(2) In the foregoing embodiments, the radiographic apparatus is constructed for medical use to conduct radiography of a patient placed on the top board 1 as shown in FIG. 1. This is not limitative. For example, the apparatus may be constructed like a nondestructive testing apparatus for industrial use which conducts radiography of an object (in this case, a subject tested) conveyed on a belt, or may be constructed like an X-ray CT apparatus for medical use.

Figure 11:
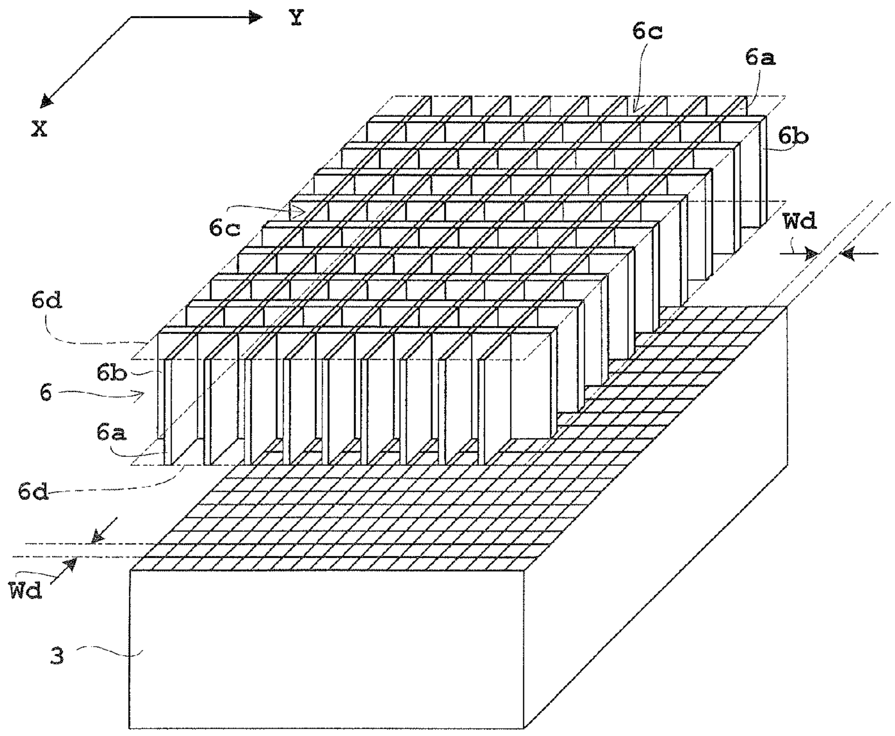
FIG. 11 is a schematic view of a cross grid in a modified embodiment.

(3) The foregoing embodiments employ an air grid as the scattered radiation removing device represented by a grid, but the grid is not limited to the air grid. The grid may have, in place of the voids, an intermediate material such as aluminum or organic substance which transmits radiation represented by X-rays. Further, a cross grid may be employed as shown in FIG. 11. Specifically, while the absorbing foil strips 6*a* and intermediate layers 6*c* extending in the X-direction in FIG. 3 are arranged alternately in order in the Y-direction in FIG. 3, absorbing foil strips 6*b* and intermediate layers 6*c* extending in the Y-direction in FIG. 3 are arranged alternately in order in the X-direction in FIG. 3, such that the absorbing foil strips 6*a* and absorbing foil strips 6*b* cross one another. The X-direction in FIG. 3 is parallel to the rows of detecting elements d of FPD 3 (see FIG. 2), while the Y-direction in FIG. 3 is parallel to the columns of detecting elements d of FPD 3 (see FIG. 2). Therefore, the directions of arrangement of the absorbing foil strips 6*a* and 6*b* are parallel to both the rows and columns of detecting elements d of FPD 3.

(4) The foregoing embodiments have been described taking the synchronous grid for example. However, the grid may be a general-purpose grid.

(5) In the foregoing embodiments, data (direct ray transmittance Cp and the like) is obtained from actual measurement with no subject in place, and other data (direct ray transmittance Cp, rate of change Rcs and so on) is obtained from actual measurement with the subject M in place, and estimation is carried out using these data. Instead, estimation may be carried out using only image pick-up data about the actual subject M as simplified procedure.

(6) In the foregoing embodiments, pixels are specified and are interpolated with parameters (direct ray transmittances Cp, rates of change Rcs and so on) of the remaining pixels not specified. Instead, parameters of all the pixels may be determined, respectively, and estimation may be carried out using data of these parameters.

This invention may be embodied in other specific forms without departing from the spirit or essential attributes thereof and, accordingly, reference should be made to the appended claims, rather than to the foregoing specification, as indicating the scope of the invention.

What is claimed is:

1. A radiographic apparatus for obtaining a radiological image, comprising:

a radiation emitting device for emitting radiation;

a scattered radiation removing device for removing scattered radiation, the scattered radiation removing device having absorbing layers arranged at predetermined intervals for absorbing the scattered radiation;

a radiation detecting device having a plurality of detecting elements arranged in rows and columns for detecting the radiation; and an estimation selecting device for estimating direct radiation intensity at pixels where direct radiation is attenuated by the absorbing layers, by assuming that the absorbing layers were absent;

wherein the estimation selecting device is arranged, when direct radiation transmittance which is a ratio between direct radiation intensity before transmission and direct radiation intensity after transmission through the scattered radiation removing device is equal or higher than a predetermined value at each pixel concerned, to estimate direct radiation intensity for the pixel concerned using actual measurement radiation intensity at the pixel concerned obtained from actual measurement and the direct radiation transmittance, and when the direct radiation transmittance is less than the predetermined value at the pixel concerned, to estimate direct radiation intensity for the pixel concerned by interpolating calculation of direct radiation intensities at pixels surrounding the pixel concerned.

2. A radiographic apparatus for obtaining a radiological image, comprising:

a radiation emitting device for emitting radiation;

a scattered radiation removing device for removing scattered radiation, the scattered radiation removing device having absorbing layers arranged at predetermined intervals for absorbing the scattered radiation;

a radiation detecting device having a plurality of detecting elements arranged in rows and columns for detecting the radiation; and an estimation selecting device for estimating, direct radiation intensity at pixels where direct radiation is attenuated by the absorbing layers, by assuming that the absorbing layers were absent;

wherein, regarding direct radiation transmittance which is a ratio between direct radiation intensity before transmission and direct radiation intensity after transmission through the scattered radiation removing device, the estimation selecting device is arranged, when a rate of change of the direct radiation transmittance which is a rate of change of the direct radiation transmittance in a direction along the absorbing layers is less than as predetermined value at each pixel concerned, to estimate direct radiation intensity for the pixel, concerned using actual measurement radiation intensities at the pixel concerned obtained from actual measurement and the direct radiation transmittance, and when the rate of change is equal or higher than the predetermined value at the pixel concerned, to estimate direct radiation intensity for the pixel concerned by interpolating calculation of direct radiation intensities at pixels surrounding the pixel concerned.

3. The radiographic apparatus according to claim 1, wherein the surrounding pixels are pixels adjoining the pixel concerned.

4. The radiographic apparatus according to claim 2, wherein the surrounding pixels are pixels adjoining the pixel concerned.

5. The radiographic apparatus according to claim 1, further comprising:

a pixel specifying device for specifying predetermined pixels;

an intensity estimating device for estimating at least either of scattered radiation intensities at the predetermined pixels specified by the pixel specifying, device and direct radiation intensities at the predetermined pixels; and an intensity interpolating device for interpolating at least either of scattered radiation intensities and direct radiation intensities at unspecified pixels, based on at least either of the scattered radiation intensities and the direct radiation intensities estimated by the intensity estimating device;

wherein the estimation selecting device is arranged, when the direct radiation transmittances are equal or higher than the predetermined value, to estimate the direct radiation intensities also using the scattered radiation intensities estimated by the intensity estimating device.

6. The radiographic apparatus according to claim 2, further comprising:

a pixel specifying device for specifying predetermined pixels;

an intensity estimating device for estimating at least either of scattered radiation intensities at the predetermined pixels specified by the pixel specifying, device and direct radiation intensities at the predetermined pixels; and an intensity interpolating device for interpolating at least either of scattered radiation intensities and direct radiation intensities at unspecified pixels, based on at least either of the scattered radiation intensities and the direct radiation intensities estimated by the intensity estimating device;

wherein the estimation selecting device is arranged, when the rates of change of the direct radiation transmittances are less than the predetermined value, to estimate the direct radiation intensities also using the scattered radiation intensities estimated by the intensity estimating device.

7. The radiographic apparatus according to claim 5, wherein, when the intensity estimating device estimates unknown radiation intensities at the predetermined pixels specified by the pixel specifying device, the pixel specifying device is arranged to determine the number of predetermined pixels to be specified according to a known number of the direct radiation transmittances which are known and a known number of the actual measurement radiation intensities which are known, and the intensity estimating device is arranged to estimate the radiation intensities by solving simultaneous equations about the actual measurement radiation intensities, the direct radiation transmittances and the radiation intensities to be estimated for the respective predetermined pixels determined.

8. The radiographic apparatus according to claim 6, wherein, when the intensity estimating, device estimates unknown radiation intensities at the predetermined pixels specified by the pixel specifying device, the pixel specifying device is arranged to determine the number of predetermined pixels to be specified according to a known number of the direct radiation transmittances which are known and a known number of the actual measurement radiation intensities which are known, and the intensity estimating device is arranged to estimate the radiation intensities by solving simultaneous equations about the actual measurement radiation intensities, the direct radiation transmittances and the radiation intensities to be estimated for the respective predetermined pixels determined.

9. The radiographic apparatus according to claim 1, wherein, when the direct radiation transmittance is less than the predetermined value, the direct radiation intensity is interpolated by linear approximation.

10. The radiographic apparatus according to claim 2, wherein, when the rate of change of the direct radiation transmittance is equal or higher than the predetermined value, the direct radiation intensity is interpolated by linear approximation.

11. The radiographic apparatus according to claim 1, wherein, when the direct radiation transmittance is less than the predetermined value, the direct radiation intensity is estimated by spline interpolation.

12. The radiographic apparatus according to claim 2, wherein, when the rate of change of the direct radiation transmittance is equal or higher than the predetermined value, the direct radiation intensity is estimated by spline interpolation.

13. The radiographic apparatus according to claim 1, wherein, when the direct radiation transmittance is less than the predetermined value, the direct radiation intensity is estimated by Lagrange interpolation.

14. The radiographic apparatus according to claim 2, wherein, when the rate of change of the direct radiation transmittance is equal or higher than the predetermined value, the direct radiation intensity is estimated by Lagrange interpolation.

* * * * *